United States Patent
Takahashi et al.

(10) Patent No.: US 10,341,097 B2
(45) Date of Patent: Jul. 2, 2019

(54) COMMUNICATION DEVICE, QUANTUM KEY DISTRIBUTION SYSTEM, QUANTUM KEY DISTRIBUTION METHOD, AND COMPUTER PROGRAM PRODUCT

(71) Applicant: Kabushiki Kaisha Toshiba, Minato-ku (JP)

(72) Inventors: Ririka Takahashi, Setagaya (JP); Yoshimichi Tanizawa, Yokohama (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 133 days.

(21) Appl. No.: 15/383,074

(22) Filed: Dec. 19, 2016

(65) Prior Publication Data
US 2017/0264434 A1 Sep. 14, 2017

(30) Foreign Application Priority Data
Mar. 14, 2016 (JP) .................. 2016-050119

(51) Int. Cl.
*H04L 29/06* (2006.01)
*H04L 9/08* (2006.01)
*H04L 9/06* (2006.01)

(52) U.S. Cl.
CPC .......... *H04L 9/0858* (2013.01); *H04L 9/0643* (2013.01); *H04L 9/0819* (2013.01)

(58) Field of Classification Search
CPC ... H04L 9/0643; H04L 9/0819; H04L 9/0858; H04L 9/08; H04L 9/0816; H04L 9/0838; H04L 9/0852; H04L 9/0855; H04L 9/858
See application file for complete search history.

(56) References Cited

U.S. PATENT DOCUMENTS

2004/0193763 A1* 9/2004 Iizuka ................... G06F 13/385
 710/52
2010/0275028 A1* 10/2010 Takashima ............ H04L 9/3247
 713/176
(Continued)

FOREIGN PATENT DOCUMENTS

GB 2503045 12/2013
JP 2015-154342 A 8/2015

OTHER PUBLICATIONS

Aditya et al. "Quantum Cryptography", Oct. 10, 2015.*
(Continued)

*Primary Examiner* — Jason K Gee
*Assistant Examiner* — Ka Shan Choy
(74) *Attorney, Agent, or Firm* — Oblon, McClelland, Maier & Neustadt, L.L.P.

(57) ABSTRACT

According to an embodiment, a communication device is connected with another communication device through a quantum communication channel with a shared encryption key. The device includes a communication unit, a sifter, a corrector, a calculator, and an extractor. The communication unit is configured to acquire a sequence of photons through the quantum communication channel and acquire a photon bit string corresponding to the sequence of photons. The sifter is configured to generate a shared bit string from the photon bit string by sifting processing using basis information. The corrector is configured to generate a corrected bit string by correcting an error included in the shared bit string. The calculator is configured to generate a hash-calculated bit string by performing hash calculation on the corrected bit string. The extractor is configured to extract, as the key, from the hash-calculated bit string, a bit string having the length of the key.

6 Claims, 11 Drawing Sheets

(56) References Cited

U.S. PATENT DOCUMENTS

| | | | |
|---|---|---|---|
| 2015/0172048 A1* | 6/2015 | Wabnig | H04B 10/70 |
| | | | 380/256 |
| 2015/0236852 A1 | 8/2015 | Tanizawa | |
| 2016/0028542 A1* | 1/2016 | Choi | H04B 10/85 |
| | | | 380/28 |
| 2016/0218867 A1* | 7/2016 | Nordholt | H04L 9/0852 |

OTHER PUBLICATIONS

M. Lucamarini et al "Efficient decoy-state quantum key distribution with quantified security", Optics Express, vol. 21, Issue 21, 2013, 18 pages.

* cited by examiner

COMMUNICATION DEVICE, QUANTUM KEY DISTRIBUTION SYSTEM, QUANTUM KEY DISTRIBUTION METHOD, AND COMPUTER PROGRAM PRODUCT

CROSS-REFERENCE TO RELATED APPLICATION

This application is based upon and claims the benefit of priority from Japanese Patent Application No. 2016-050119, filed on Mar. 14, 2016; the entire contents of which are incorporated herein by reference.

FIELD

Embodiments described herein relate generally to a communication device, a quantum key distribution system, a quantum key distribution method, and a computer program product.

BACKGROUND

A quantum key distribution system generally includes a transmitter, a receiver, and an optical fiber link connecting them together. The transmitter continuously transmits single photons to the receiver through the optical fiber link (quantum communication channel) serving as a communication channel of an optical fiber. The transmitter and the receiver then exchange control information with each other so as to securely share an encryption key between the transmitter and the receiver. This technique is achieved using a technology generally called quantum key distribution (QKD).

In the quantum key distribution, the photons used for sharing the encryption key follow the uncertainty principle that is one of basic principles of quantum mechanics and states that a physical state is changed by being observed. Based on this principle, if an eavesdropper observes the photons including the information on the encryption key transmitted by the transmitter in the quantum communication channel, the physical state of the photons changes, so that the receiver that has received the photons can detect that the photons have been observed by the eavesdropper. As a result, a secure encryption key can be obtained by exchanging the control information between the transmitter and the receiver based on the sequence of photons obtained by the transmitter and the sequence of photons detected by the receiver.

Key distillation processing needs to be executed at each of the transmitter and the receiver to share an encryption key between the transmitter and the receiver by the quantum key distribution. The key distillation processing includes sifting processing, error correction processing, and privacy amplification processing. The sifting processing extracts a bit string for which bases used at the transmitter and the receiver match with each other. The error correction processing corrects error in the bit string generated for the transmitter and the receiver. The privacy amplification processing compresses the bit string to discard information probably eavesdropped by an eavesdropper. In this manner, the transmitter and the receiver share a secure encryption key guaranteed not to have been eavesdropped. The shared encryption key is used to perform encrypted data communication between the transmitter and the receiver or between applications connected with the transmitter and the receiver.

In the quantum key distribution, as described above, according to the fundamental principle of quantum mechanics, when an eavesdropper on the quantum communication channel observes a photon transmitted by the transmitter, the physical state of the photon is changed, and this change appears in a quantum bit error rate (QBER) of the link between the transmitter and the receiver. Any attempt to eavesdrop the photon by the eavesdropper changes the physical state of the photon and results in an increase in the QBER, which tells the presence of the eavesdropper to the receiver and the transmitter.

A disclosed quantum key distribution system uses a decoy state QKD protocol, and a protocol that the probability of selection of a basis on which the polarization of the photon is observed is biased, so as to efficiently generate a highly secure encryption key obtained by removing the amount of information leaked to the eavesdropper. This system estimates a parameter necessary for calculation from a value measured when the quantum key distribution is performed, and derives a formula for calculation of the key length of an encryption key that achieves implementation on a real system and sufficient security.

The generation amount of encryption key shared in a unit time is called a secure key rate. A higher secure key rate indicates higher performance of the quantum key distribution system because the encrypted data communication can be achieved faster and more securely by using a larger number of encryption keys.

In the above-described privacy amplification processing by such a quantum key distribution system, the key length calculation of the length of a final encryption key is performed, followed by hash calculation, which is a matrix calculation using a hash corresponding to the calculated length of an encryption key. These calculations, however, generate a heavy load and hence an increase in processing time of the privacy amplification processing. This causes an increase in processing time of the whole quantum key distribution, leading to a decrease in the secure key rate.

DETAILED DESCRIPTION

Figure 1:
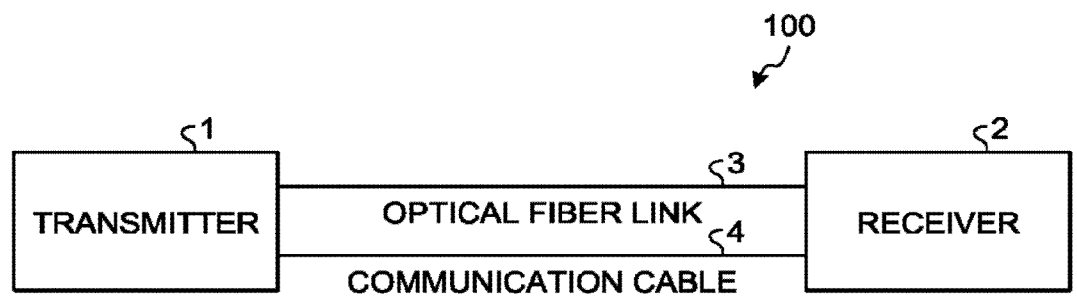
FIG. 1 is a diagram illustrating an exemplary entire configuration of a quantum key distribution system.

According to an embodiment, a communication device is connected with another communication device through a quantum communication channel to share an encryption key with the other communication device. The device includes a photon communication unit, a sifter, an error corrector, a first calculator, a second calculator, and an extractor. The photon communication unit is configured to acquire a sequence of photons by photon transmission and reception processing through the quantum communication channel and acquire a photon bit string that is bit information corresponding to the sequence of photons based on generated basis information. The sifter is configured to generate a shared bit string from the photon bit string by sifting processing using the basis information. The error corrector is configured to generate a corrected bit string by correcting an error included in the shared bit string by error correction processing. The first calculator is configured to calculate a length of the encryption key. The second calculator is configured to generate a hash-calculated bit string by performing hash calculation on the corrected bit string using first information having a particular size for the hash calculation. The extractor is configured to extract, as the encryption key, from the hash-calculated bit string, a bit string having the length of the encryption key calculated by the first calculator.

A communication device, a quantum key distribution system, a quantum key distribution method, and a computer program according to embodiments of the present invention will be described below in detail with reference to the drawings. In the drawings, any identical part is denoted by an identical reference numeral. Each drawing is schematically illustrated, and thus a specific configuration should be determined based on the following description.

First Embodiment

FIG. 1 is a diagram illustrating an exemplary configuration of a quantum key distribution system. The configuration of this quantum key distribution system 100 will be described with reference to FIG. 1.

As illustrated in FIG. 1, the quantum key distribution system 100 includes a transmitter 1, a receiver 2, an optical fiber link 3, and a communication cable 4. The following describes the quantum key distribution system 100 including the single transmitter 1 and the single receiver 2 as illustrated in FIG. 1. However, the quantum key distribution system may be, for example, what is called a quantum access network (QAN) in which the single receiver 2 is connected with a plurality of the transmitters 1 through an optical device. Alternatively, the quantum key distribution system may be configured such that the receiver 2 includes a plurality of optical-fiber communication interfaces and is connected with a plurality of the transmitters 1 through these interfaces. In these systems, the transmitter 1 and the receiver 2 may be arranged in an opposite manner to those described above.

The transmitter 1 is a device configured to transmit, to the receiver 2 through the optical fiber link 3, a series of single photons generated by laser pulses and used to generate an encryption key. The transmitter 1 generates the encryption key by executing, for example, key distillation processing (sifting processing, error correction processing, and privacy amplification processing) to be described later based on the series of transmitted photons. The transmitter 1 performs data communication with the receiver 2 through a classical communication channel achieved by the communication cable 4, such as an Ethernet (registered trademark) cable, other than a quantum communication channel achieved by the optical fiber link 3. Data communicated through the classical communication channel may be control data necessary for the above-described key distillation processing (hereinafter also referred to as "key distillation processing data"), or any other typical data.

The receiver 2 is a device configured to receive, from the transmitter 1 through the optical fiber link 3, the series of single photons used to generate the encryption key. The receiver 2 generates an encryption key identical to the encryption key generated by the transmitter 1, by executing, for example, the key distillation processing (the sifting processing, the error correction processing, and the privacy amplification processing) to be described later based on the series of received photons. In other words, the transmitter 1 and the receiver 2 sequentially generate and share identical encryption keys. The receiver 2 performs data communication with the transmitter 1 through the classical communication channel achieved by the communication cable 4, which is other than the quantum communication channel achieved by the optical fiber link 3. Data communicated through the classical communication channel may be the key distillation processing data necessary for the above-described key distillation processing, or any other typical data.

The optical fiber link 3 is an optical fiber cable that functions as a quantum communication channel serving as a transmission path of the single photons output by the transmitter 1. The communication cable 4 is a cable serving as a classical communication channel for communicating the key distillation processing data and the communication data of applications or the like between the transmitter 1 and the receiver 2.

The communication cable 4 functions as the classical communication channel in the above description, but the present embodiment is not limited thereto. The classical communication channel may be achieved by wireless communication.

The optical fiber link 3 functions as the quantum communication channel and the communication cable 4 functions as the classical communication channel in the above description, but the present embodiment is not limited thereto. For example, in the optical fiber link 3, a photon communication channel for transmission and reception of photons, and an optical data communication channel for performing optical data communication may be formed by a wavelength division multiplex (WDM) technology or the like. In other words, in this case, the photon communication channel of the optical fiber link 3 functions as the quantum communication channel, and the optical data communication channel thereof functions as the classical communication channel.

With the quantum key distribution system 100 including the transmitter 1 and the receiver 2 described above, if an eavesdropper observes the sequence of photons transmitted by the transmitter 1 on the optical fiber link 3, the physical state of the photons changes, so that the receiver 2 that has received the photons can find out that the photons have been observed by the eavesdropper.

Figure 2:
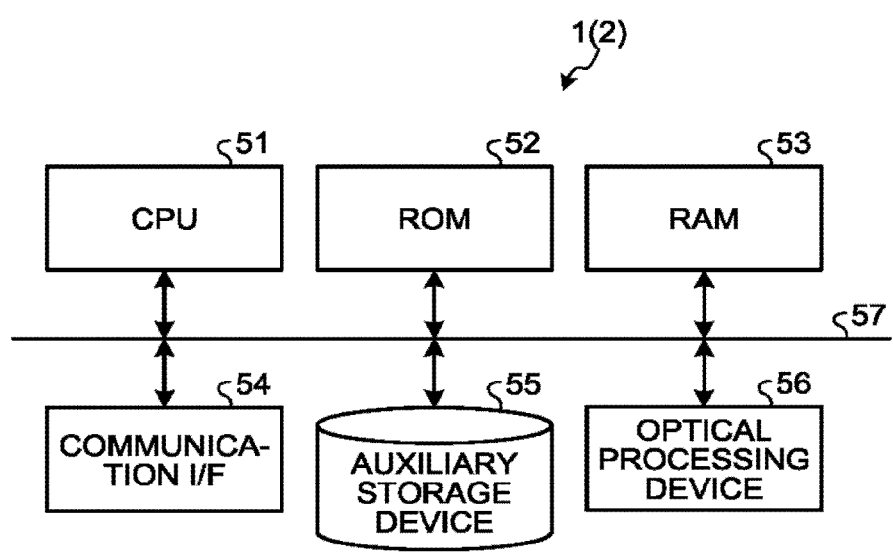
FIG. 2 is a diagram illustrating an exemplary hardware configuration of a transmitter or a receiver.

FIG. 2 is a diagram illustrating an example of a hardware configuration of each of the transmitter and the receiver. The hardware configuration of each of the transmitter 1 and the receiver 2 will be described with reference to FIG. 2.

As illustrated in FIG. 2, the transmitter 1 (receiver 2) includes a central processing unit (CPU) 51, a read-only memory (ROM) 52, a random access memory (RAM) 53, a communication interface (I/F) 54, an auxiliary storage device 55, and an optical processing device 56.

The CPU 51 is an arithmetic device that controls the overall operation of the transmitter 1 (receiver 2). The ROM 52 is a nonvolatile storage device that stores computer programs, including, for example, a basic input/output system (BIOS) or firmware, executed by the CPU 51 to control functions. The RAM 53 is a volatile storage device that serves as a work memory of the CPU 51.

The communication I/F 54 is an interface for performing data communication through the classical communication channels (such as the communication cable 4). The communication I/F 54 may be an interface supporting an Ethernet standard, such as 10Base-T, 100Base-TX, or 1000Base-T, or may be an interface for an optical fiber.

The auxiliary storage device 55 is a non-volatile storage device configured to store and accumulate therein various computer programs executed by the CPU 51, data generated in the key distillation processing, and an encryption key generated by the key distillation processing. The auxiliary storage device 55 is a non-volatile storage device, such as a hard disk drive (HDD), a solid state drive (SSD), a flash memory, or an optical disk, that is capable of electrically, magnetically, or optically storing therein information.

The optical processing device 56 is an optical device configured to transmit or receive (detect) a single photon through the quantum communication channel. The optical processing device 56 of the transmitter 1 transmits a series of single photons to the optical processing device 56 of the receiver 2 through the quantum communication channel (the optical fiber link 3 illustrated in FIG. 1). Each photon is generated in a phase state or a polarization state based on basis information (transmission basis) generated from, for example, a bit string (photon bit string) that is bit information generated based on a random number, by using a basis selected according to a predetermined reference. In other words, each of the sequence of photons generated by the optical processing device 56 of the transmitter 1 has one-bit information that is "0" or "1". The optical processing device 56 of the receiver 2 receives the sequence of photons from the optical processing device 56 of the transmitter 1 through the quantum communication channel, and obtains the photon bit string, which is bit information, by reading the series of received photons based on basis information (reception basis) generated by using a basis selected according to a predetermined reference.

Each basis selected according to the predetermined reference for generating basis information may be, for example, a randomly selected basis, or a basis selected with a biased selection probability.

The CPU 51, the ROM 52, the RAM 53, the communication I/F 54, the auxiliary storage device 55, and the optical processing device 56 are connected so as to be capable of communicating with one another through a bus 57 including an address bus, a data bus, and the like.

Figure 3:
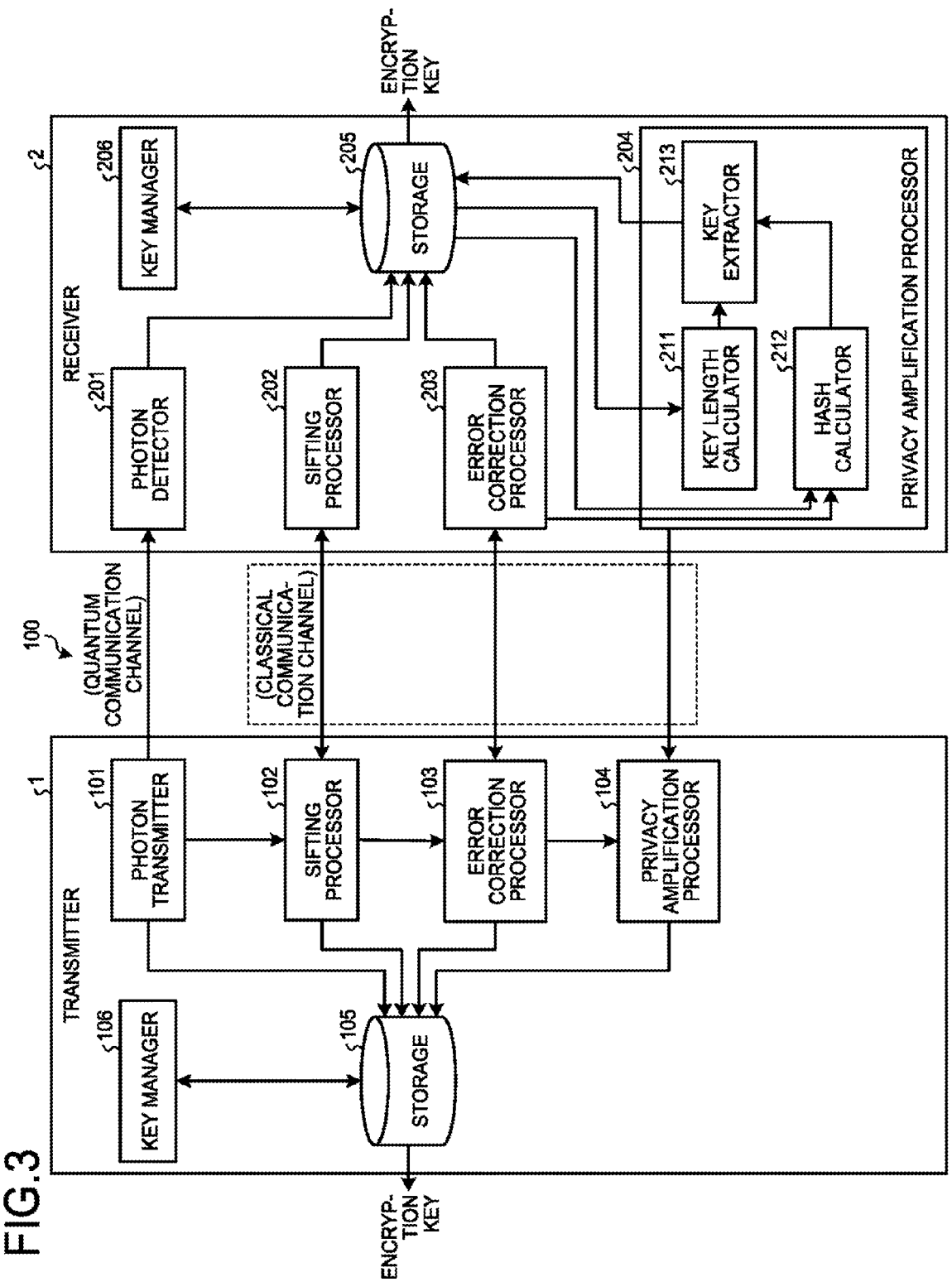
FIG. 3 is a diagram illustrating a functional block configuration of a quantum key distribution system according to a first embodiment.

FIG. 3 is a diagram illustrating an example of a configuration of functional blocks in the quantum key distribution system according to the first embodiment. The following describes the configuration and operations of the functional blocks in the transmitter 1 and the receiver 2 of the quantum key distribution system 100 with reference to FIG. 3.

As illustrated in FIG. 3, the transmitter 1 includes a photon transmitter 101, a sifting processor 102, an error correction processor 103, a privacy amplification processor 104, a storage 105, and a key manager 106.

The photon transmitter 101 is a functional unit configured to perform photon transmission processing of transmitting a series of single photons to a photon detector 201 of the receiver 2 to be described later through the quantum communication channel, each photon being generated corresponding to a phase state or a polarization state based on basis information (transmission basis) generated from, for example, a photon bit string that is bit information generated based on a random number, by using a basis selected according to a predetermined reference. In other words, the photon transmitter 101 continuously transmits a single photon included in the above-described sequence of photons.

In the photon transmission processing by the photon transmitter 101, for example, an attenuated normal laser light source is used as a generation source of a single photon. When the normal laser light source is used, a plurality of photons instead of a single photon are transmitted by the photon transmitter 101 at encoding of a photon bit string with a transmission basis in some cases. A method based on the above-described decoy state QKD protocol may be used to avoid such a case and guarantee the security of quantum key distribution. In the decoy state QKD protocol, the intensity of output laser is set to a plurality of levels, and a laser (pulse) at an intensity different from that in normal bit transmission is transmitted with an arbitrary probability. In the photon transmission processing, each bit of a photon bit string is encoded into a single photon in the phase state or polarization state of light determined by the corresponding transmission basis.

The photon transmitter 101 stores the generated photon bit string and transmission basis in the storage 105, and transmits the generated photon bit string and transmission basis to the sifting processor 102. The photon transmitter 101 is achieved by the optical processing device 56 illustrated in FIG. 2.

The sifting processor 102 is a functional unit configured to execute the sifting processing in which the basis information (reception basis) received through the classical communication channel from a sifting processor 202 of the receiver 2, and the basis information (transmission basis) generated by the photon transmitter 101 are compared with each other to extract a bit corresponding to a basis matching part from the photon bit string and generate a shared bit string. The photon bit string used by the sifting processor 102 may be obtained by reading the photon bit string stored in the storage 105 by the photon transmitter 101, or may be a photon bit string directly received from the photon transmitter 101.

The sifting processor 102 stores the generated shared bit string in the storage 105, and transmits the shared bit string to the error correction processor 103. The sifting processor 102 also transmits the basis information (transmission basis) to the sifting processor 202 of the receiver 2 through the classical communication channel.

When operated based on, for example, the decoy state QKD protocol, the sifting processor 102 generates statistics information (hereinafter also referred to as "pulse statistics information") (second information or pulse information) indicating a pulse that each bit of the shared bit string corresponds to, from a result of recognition, by the photon detector 201, of a pulse that each bit of the photon bit string corresponds to. The sifting processor 102 transmits the generated pulse statistics information to the sifting processor 202 of the receiver 2 through the classical communication channel, and stores the generated pulse statistics information in the storage 105. The sifting processing described above is exemplary, and any other method may be applied.

The error correction processor 103 is a functional unit configured to execute the error correction processing of exchanging control data (error correction (EC) information) with an error correction processor 203 of the receiver 2 to be described later through the classical communication channel, and correcting any bit error in the shared bit string to generate a corrected bit string. The shared bit string used by the error correction processor 103 may be obtained by reading the shared bit string stored in the storage 105 by the sifting processor 102, or may be a shared bit string directly received from the sifting processor 102.

The error correction processor 103 stores the generated corrected bit string in the storage 105, and transmits the generated corrected bit string to the privacy amplification processor 104. When the error correction processing is successful, this corrected bit string generated by the error correction processor 103 matches with the corrected bit string generated by correcting the shared bit string by the error correction processor 203 of the receiver 2 to be described later. The corrected bit string is a bit string obtained by correcting any bit error in the shared bit string, and thus has a length identical to that of the shared bit string.

The privacy amplification processor 104 is a functional unit configured to receive control information (privacy amplification (PA) information) (for example, the size of an encryption key calculated by a privacy amplification processor 204 of the receiver 2 to be described later) from the privacy amplification processor 204 through the classical communication channel, and generate an encryption key by performing, on the corrected bit string based on the PA information, the privacy amplification processing of discarding a bit probably leaked and eavesdropped by an eavesdropper in the photon transmission processing, the sifting processing, and the error correction processing in theory. The privacy amplification processor 104 stores and accumulates the generated encryption key in the storage 105. The corrected bit string used by the privacy amplification processor 104 may be obtained by reading the corrected bit string stored in the storage 105 by the error correction processor 103, or may be a corrected bit string directly received from the error correction processor 103.

When the privacy amplification processing is successful, the encryption key generated by the privacy amplification processor 104 matches with the encryption key generated by the privacy amplification processor 204 of the receiver 2, and thus the identical encryption keys are shared. These shared encryption keys are used to perform the encrypted data communication between the transmitter 1 and the receiver 2 or between applications connected with the transmitter 1 and the receiver 2.

The storage 105 is a functional unit configured to store and accumulate therein the encryption key generated by the privacy amplification processor 104. The storage 105 also stores therein, for example, the photon bit string and the transmission basis generated by the photon transmitter 101, the shared bit string generated by the sifting processor 102, and the corrected bit string generated by the error correction processor 103. The storage 105 is achieved by the auxiliary storage device 55 illustrated in FIG. 2.

The key manager 106 is a functional unit configured to perform management (key management) of the encryption key stored (accumulated) in the storage 105. For example, the key manager 106 provides the encryption key stored in the storage 105 to an application that performs the encrypted data communication.

The photon transmitter 101, the sifting processor 102, the error correction processor 103, the privacy amplification processor 104, and the key manager 106 described above are each achieved by the CPU 51 illustrated in FIG. 2 loading a computer program stored in, for example, the auxiliary storage device 55 onto the RAM 53 and executing the computer program. However, not all of the photon transmitter 101, the sifting processor 102, the error correction processor 103, the privacy amplification processor 104, and the key manager 106 need to be achieved through execution of a computer program. At least one of them may be achieved by, for example, a hardware circuit such as application specific integrated circuit (ASIC), a field-programmable gate array (FPGA), or any other integrated circuit.

FIG. 3 conceptually illustrates functions of the photon transmitter 101, the sifting processor 102, the error correction processor 103, the privacy amplification processor 104, the storage 105, and the key manager 106, and the present embodiment is not limited to such a configuration. For example, in the transmitter 1 illustrated in FIG. 3, a plurality of functional units illustrated as independent functional units may be configured as one functional unit. Alternatively, in the transmitter 1 illustrated in FIG. 3, a function of one functional unit may be divided into a plurality of functions, and the one functional unit may be a plurality of functional units.

The key manager 106 among the functional units of the above-described transmitter 1 may be excluded.

As illustrated in FIG. 3, the receiver 2 includes the photon detector 201 (an exemplary photon communicating unit), the sifting processor 202 (sifting unit), the error correction processor 203 (error correcting unit), the privacy amplification processor 204, a storage 205, and a key manager 206.

The photon detector 201 is a functional unit configured to perform photon detection processing of detecting a sequence of photons transmitted from the photon transmitter 101 of the transmitter 1 through the quantum communication channel, and obtaining a photon bit string that is bit information by reading the series of detected photons based on basis information (reception basis) generated by using a basis selected according to a predetermined reference. The photon detector 201 stores the generated photon bit string and reception basis in the storage 205, and transmits the generated photon bit string and reception basis to the sifting processor 202. The photon detector 201 is achieved by the optical processing device 56 illustrated in FIG. 2. In the following, "photon transmission and reception processing" refers to one or both of the photon transmission processing by the photon transmitter 101 and the photon detection processing by the photon detector 201 described above.

The sifting processor 202 is a functional unit that compares basis information (transmission basis) received from the sifting processor 102 of the transmitter 1 through the classical communication channel with basis information (reception basis) generated by the photon detector 201 and extracts a bit corresponding to a matching part from the photon bit string, thereby performing the sifting processing to generate the shared bit string. The photon bit string used by the sifting processor 202 may be a read photon bit string stored in the storage 205 by the photon detector 201, or may be a photon bit string directly received from the photon detector 201.

The sifting processor 202 stores the generated shared bit string in the storage 205, and transmits the generated shared bit string to the error correction processor 203. The sifting processor 202 transmits the basis information (transmission basis) to the sifting processor 102 of the transmitter 1 through the classical communication channel. The sifting processor 202 receives the pulse statistics information from the sifting processor 102 of the transmitter 1 through the classical communication channel, and stores the pulse statistics information in the storage 205. The sifting processing described above is exemplary, and any other method is applicable.

The error correction processor 203 is a functional unit configured to execute the error correction processing of exchanging the control data (EC information) with the error correction processor 103 of the transmitter 1 through the classical communication channel, and correcting a bit error in the shared bit string to generate a corrected bit string. The shared bit string used by the error correction processor 203 may be obtained by reading the shared bit string stored in the storage 205 by the sifting processor 202, or may be a shared bit string directly received from the sifting processor 202.

The error correction processor 203 stores the generated corrected bit string in the storage 205, and transmits the generated corrected bit string to the privacy amplification processor 204. When the error correction processing is successful, this corrected bit string generated by the error correction processor 203 matches with the corrected bit string generated by correcting the shared bit string by the error correction processor 103 of the transmitter 1. The corrected bit string is a bit string obtained by correcting a bit error in the shared bit string, and thus has a length identical to that of the shared bit string.

The error correction processor 203 calculates the error rate (above-described QBER) of the quantum communication channel from the number of error bits in the shared bit string in the error correction processing, and stores the error rate in the storage 205. The error correction processor 203 also calculates the number of leaked bits based on the amount of the EC information exchanged with the error correction processor 103 to generate a corrected bit string by correcting a bit error in the shared bit string, and stores the calculated number of leaked bits in the storage 205. It is assumed that all the exchanged EC information is leaked to an eavesdropper, and a larger number of leaked bits indicates a higher probability of eavesdropping and a larger amount of eavesdropped information.

The privacy amplification processor 204 is a functional unit configured to generate the control information (PA information), transmit the PA information to the privacy amplification processor 104 of the transmitter 1 through the classical communication channel, and generate an encryption key by performing, on the corrected bit string based on this PA information, the privacy amplification processing of discarding a bit probably leaked and eavesdropped by an eavesdropper in the photon transmission processing, the sifting processing, and the error correction processing in theory. The corrected bit string used by the privacy amplification processor 204 may be obtained by reading the corrected bit string stored in the storage 205 by the error correction processor 203, or may be a corrected bit string directly received from the error correction processor 203. The privacy amplification processor 204 includes a key length calculator 211 (first calculator), a hash calculator 212 (second calculator), and a key extractor 213 (extractor).

The key length calculator 211 is a functional unit configured to perform key length calculation in which the length of an encryption key finally obtained through the privacy amplification processing is calculated to be a length removing the amount of information probably eavesdropped by an eavesdropper in communication between the transmitter 1 and the receiver 2 based on the pulse statistics information (including the number of counts and the number of errors for each type of pulse) received by the sifting processor 202, and the error rate and the number of leaked bits calculated by the error correction processor 203. The key length calculator 211 transmits the calculated length of an encryption key to the key extractor 213. The pulse statistics information, the error rate, and the number of leaked bits used by the key length calculator 211 may be obtained by reading the pulse statistics information, the error rate, and the number of leaked bits stored in the storage 205, or may be information directly received from the sifting processor 202 and the error correction processor 203.

The hash calculator 212 is a functional unit configured to perform, on the corrected bit string generated by the error correction processor 203, hash calculation using a hash matrix (exemplary first information or exemplary hash information) common to the transmitter 1 and the receiver 2 of a predetermined size so as to generate a bit string after the hash calculation (hereinafter also referred to as "hash-calculated bit string"). The size of the hash matrix used in the present embodiment will be described later in detail with reference to FIG. 7. The hash calculator 212 stores the generated hash-calculated bit string in the storage 205, and transmits the generated hash-calculated bit string to the key extractor 213. The hash matrix does not necessarily need to be a matrix form, but may be any form that allows the hash calculation on the corrected bit string.

The key extractor 213 is a functional unit configured to extract, from the hash-calculated bit string generated by the hash calculator 212, a bit string having the length of an encryption key calculated by the key length calculator 211. The key extractor 213 sets the extracted bit string to be a final encryption key, and stores (accumulates) the final encryption key in the storage 205. The hash-calculated bit string used by the key extractor 213 may be obtained by reading the hash-calculated bit string stored in the storage 105 by the hash calculator 212, or may be a hash-calculated bit string directly received from the hash calculator 212.

When the privacy amplification processing is successful, the encryption key generated by the privacy amplification processor 204, in other words, the encryption key extracted by the key extractor 213 matches with the encryption key generated by the privacy amplification processor 104 of the transmitter 1, and thus the identical encryption keys are shared. These shared encryption keys are used to perform the encrypted data communication between the transmitter 1 and the receiver 2 or between applications connected with the transmitter 1 and the receiver 2.

The storage 205 is a functional unit configured to store and accumulate therein the encryption key generated by the privacy amplification processor 204. The storage 205 also stores therein, for example, the photon bit string and reception basis acquired by the photon detector 201, the shared bit string generated by the sifting processor 202, the corrected bit string generated by the error correction processor 203, and the hash-calculated bit string generated by the hash calculator 212. The storage 205 is achieved by the auxiliary storage device 55 illustrated in FIG. 2.

The key manager 206 is a functional unit configured to perform management (key management) of the encryption key stored (accumulated) in the storage 205. For example, the key manager 206 provides the encryption key stored in the storage 205 to an application that performs the encrypted data communication.

The photon detector 201, the sifting processor 202, the error correction processor 203, the key length calculator 211, the hash calculator 212, and the key extractor 213 of the privacy amplification processor 204, and the key manager 206 described above are each achieved by the CPU 51 illustrated in FIG. 2 loading a computer program stored in, for example, the auxiliary storage device 55 onto the RAM 53, and executing the computer program. Not all of the photon detector 201, the sifting processor 202, the error correction processor 203, the key length calculator 211, the hash calculator 212, and the key extractor 213 of the privacy amplification processor 204, and the key manager 206 need to be achieved through execution of a computer program. At least one of them, may be achieved by, for example, a hardware circuit such as an ASIC, an FPGA, or any other integrated circuit.

FIG. 3 conceptually illustrates functions of the photon detector 201, the sifting processor 202, the error correction processor 203, the key length calculator 211, the hash calculator 212, and the key extractor 213 of the privacy amplification processor 204, the storage 205, and the key manager 206, and the present embodiment is not limited to such a configuration. For example, in the receiver 2 illustrated in FIG. 3, a plurality of functional units illustrated as independent functional units may be configured as one functional unit. Alternatively, in the receiver 2 illustrated in FIG. 3, a function of one functional unit may be divided into a plurality of functions, and the one functional unit may be configured as a plurality of functional units.

The key manager 206 among the functional units of the above-described receiver 2 may be excluded.

Figure 4:
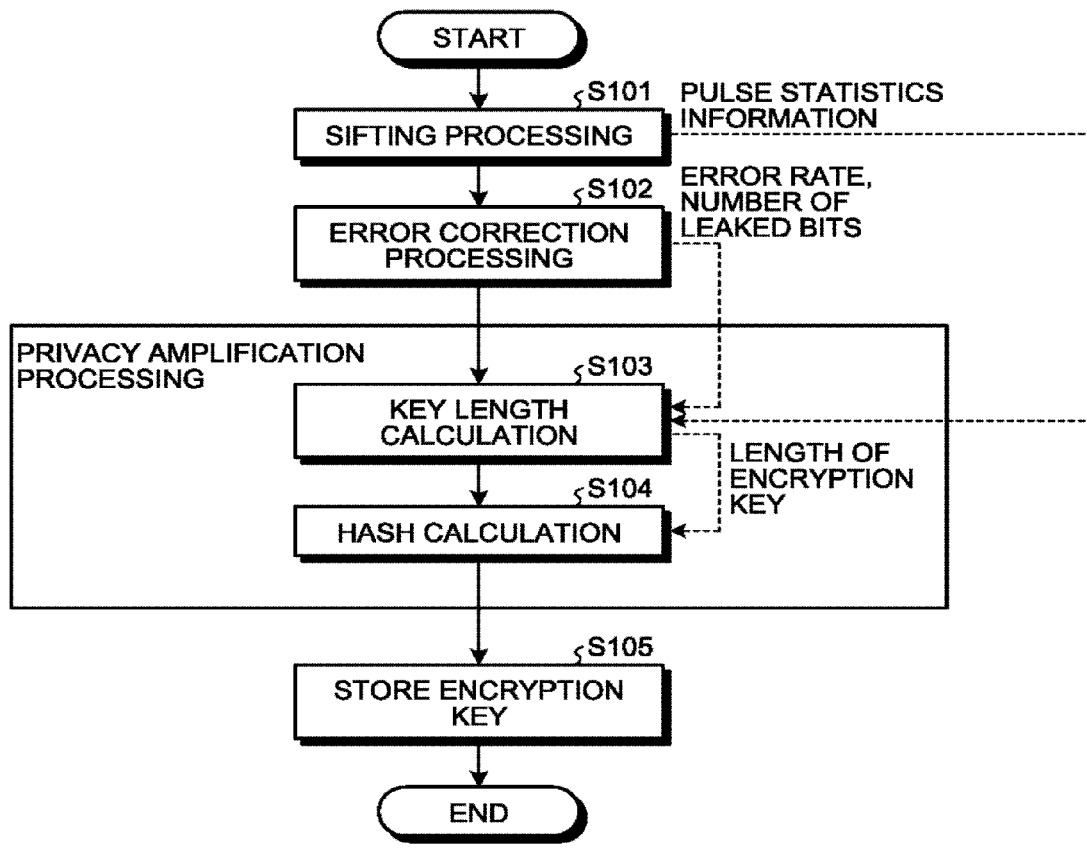
FIG. 4 is a flowchart of an exemplary operation of conventional key distillation processing.
Figure 5:
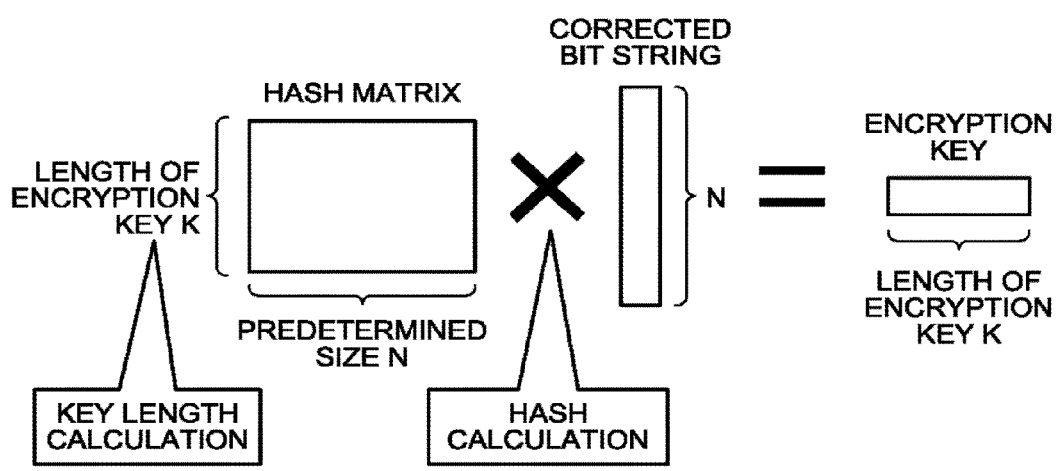
FIG. 5 is a diagram illustrating conventional hash calculation.

FIG. 4 is a flowchart of an exemplary operation of the conventional key distillation processing. FIG. 5 is a diagram illustrating the conventional hash calculation. The operation of the conventional key distillation processing will be described with reference to FIGS. 4 and 5.

Step S101

The sifting processor of the receiver executes the sifting processing in which basis information (transmission basis) received from the sifting processor of the transmitter through the classical communication channel and basis information (reception basis) generated by the photon detector of the receiver are compared with each other to extract a bit corresponding to a matching part from a photon bit string and generate a shared bit string. The sifting processor receives the pulse statistics information from the sifting processor of the transmitter through the classical communication channel. Then, the process proceeds to step S102.

Step S102

The error correction processor of the receiver executes the error correction processing of exchanging the control data (the EC information) with the error correction processor of the transmitter through the classical communication channel, and correcting a bit error in the shared bit string to generate a corrected bit string. The error correction processor of the receiver also calculates the error rate of the quantum communication channel from the number of error bits in the shared bit string in the error correction processing. In addition, the error correction processor of the receiver calculates the number of leaked bits based on the amount of the EC information exchanged with the error correction processor of the transmitter to correct a bit error in the shared bit string to generate a corrected bit string. Then, the process proceeds to step S103.

Step S103

The privacy amplification processor of the receiver includes the key length calculator and the hash calculator.

The key length calculator of the receiver calculates a length K of an encryption key finally obtained through the privacy amplification processing so that the length K is a length removing the amount of information probably eavesdropped by an eavesdropper in communication between the transmitter and the receiver based on the pulse statistics information (including the number of counts and the number of errors for each type of pulse) received from the transmitter by the sifting processor of the receiver, and the error rate and the number of leaked bits calculated by the error correction processor of the receiver. The key length calculator transmits the calculated length K of an encryption key to the hash calculator. Then, the process proceeds to step S104.

Step S104

As illustrated in FIG. 5, the hash calculator generates a hash matrix common to the transmitter and the receiver and having a size of the length K of an encryption key calculated by the key length calculator and a predetermined size N, and generates an encryption key having the length K by performing the hash calculation using the generated hash matrix on the corrected bit string generated by the error correction processor of the receiver. In other words, in the privacy amplification processing in the conventional key distillation processing, the length K of an encryption key, which defines the size of the hash matrix, needs to be determined at generation of the hash matrix before the hash calculation. Thus, the key length calculation and the hash calculation cannot be simultaneously performed: the hash calculation needs to be performed after the length K of an encryption key is calculated through the key length calculation.

Although the predetermined size N is set to be the length of the corrected bit string as illustrated in FIG. 5, but the present embodiment is not limited thereto. For example, in addition to the case in which the hash calculation is performed on one corrected bit string generated by the error correction processor as illustrated in FIG. 5, the hash calculation using one hash matrix is performed collectively on a plurality of corrected bit strings in some cases. In such a case, the hash matrix needs to have the predetermined size N equal to the sum of the lengths of the corrected bit strings. Then, the process proceeds to step S105.

Step S105

The hash calculator stores (accumulates) the generated encryption key in the storage of the receiver.

The conventional key distillation processing is performed through the above-described process at steps S101 to S105. In the key length calculation by the key length calculator, it is assumed that a higher error rate indicates a larger amount of information leaked to an eavesdropper, and the length of an encryption key is reduced to generate a secure encryption key. The length of this final encryption key is calculated by using information obtained by calculating an error rate for a combination of a pulse and a basis, calculating the number of counts and the number of errors from the pulse statistics information generated by the sifting processing, and calculating the number of bits (number of leaked bits) leaked on the classical communication channel in the error correction processing, so as to estimate the amount of information leaked to the eavesdropper. Thus, the key length calculation takes a long processing time and is difficult to speed up by parallelization, and thus is a factor leading to decrease in a secure key rate.

The hash calculation by the hash calculator is matrix calculation between the corrected bit string and the hash matrix, which allows parallel processing, but simple implementation thereof leads to a long processing time, and thus is a factor leading to decrease in the secure key rate.

In addition, the hash calculation determines the size of the hash matrix by using the length of an encryption key calculated by the key length calculation as described above, and thus cannot be executed before the key length calculation. Thus, the key length calculation and the hash calculation, which are heavily loaded processing, are sequentially executed in the conventional key distillation processing, resulting in a longer processing time and further decrease in the secure key rate.

Figure 6:
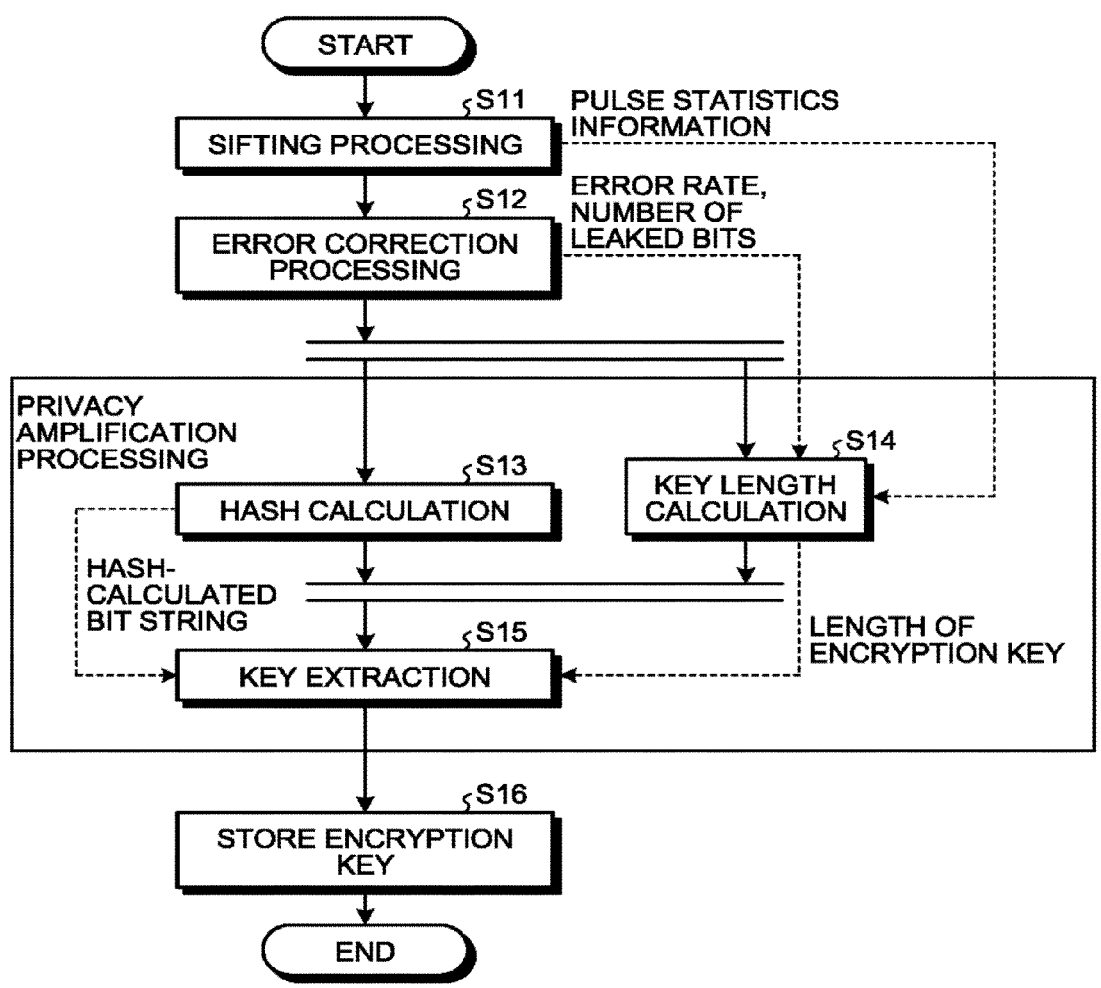
FIG. 6 is a flowchart of an operation of key distillation processing by the receiver according to the first embodiment.
Figure 7:
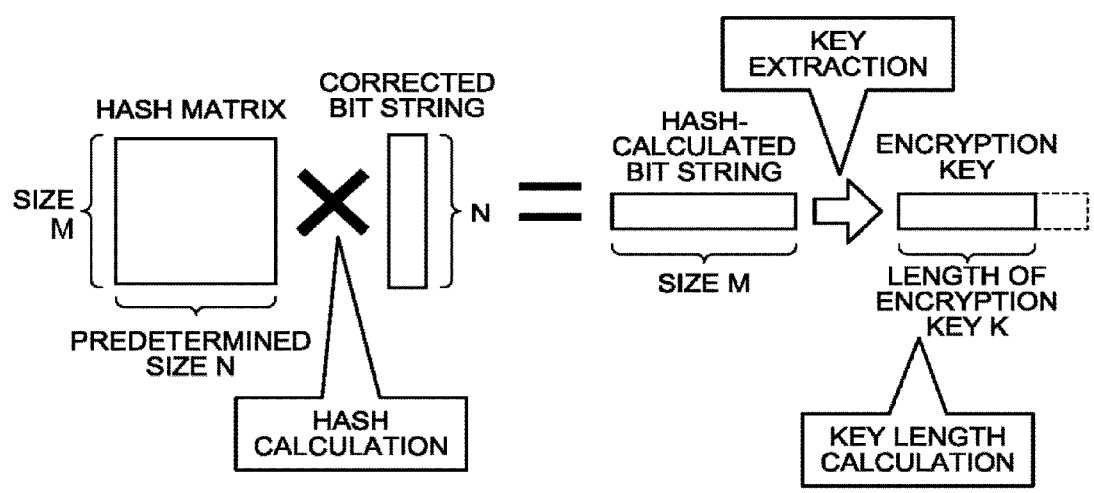
FIG. 7 is a diagram illustrating hash calculation by the receiver according to the first embodiment.

FIG. 6 is a flowchart of an exemplary operation of the key distillation processing by the receiver according to the first embodiment. FIG. 7 is a diagram illustrating the hash calculation by the receiver according to the first embodiment. The following describes the operation of the key distillation processing according to the present embodiment with reference to FIGS. 6 and 7, in comparison with the conventional key distillation processing described above with reference to FIGS. 4 and 5.

Step S11

The sifting processor 202 executes the sifting processing in which basis information (transmission basis) received from the sifting processor 102 of the transmitter 1 through the classical communication channel and basis information (reception basis) generated by the photon detector 201 are compared with each other to extract a bit corresponding to a matching part from a photon bit string and generate a shared bit string. The sifting processor 202 also receives the pulse statistics information from the sifting processor 102 of the transmitter 1 through the classical communication channel. Then, the process proceeds to step S12.

Step S12

The error correction processor 203 executes the error correction processing of exchanging the control data (the EC information) with the error correction processor 103 of the transmitter 1 through the classical communication channel, and correcting a bit error in the shared bit string to generate a corrected bit string. The error correction processor 203 also calculates the error rate of the quantum communication channel from the number of error bits in the shared bit string in the error correction processing. In addition, the error correction processor 203 calculates the number of leaked bits based on the amount of the EC information exchanged with the error correction processor 103 to correct a bit error in the shared bit string to generate a corrected bit string. Then, the process proceeds to steps S13 and S14. In other words, the hash calculation by the hash calculator 212 and the key length calculation by the key length calculator 211 are executed in parallel with each other.

Step S13

The hash calculator 212 performs, on the corrected bit string generated by the error correction processor 203, the hash calculation using the hash matrix having a predetermined size and common to the transmitter 1 and the receiver 2 to generate a bit string (the hash-calculated bit string) obtained through the hash calculation.

The size (N in FIG. 7) of the corrected bit string can be assumed as the maximum value of a size M that defines the size of the hash matrix illustrated in FIG. 7 because a final encryption key never has a length larger than the length of the corrected bit string when the probability of eavesdropping is taken into account. In other words, the hash calculator 212 may set the size M to be N and perform the hash calculation using an N×N hash matrix on the corrected bit string. Typically, in the hash calculation, a direct matrix calculation between the hash matrix and a vector requires the calculation amount of $O(n^2)$ for a hash matrix having the size N, and thus a larger size of the hash matrix leads to an increase in the processing time. Use of a number-theoretical transform (NTT), however, allows reduction to the calculation amount of $O(n \log n)$, thereby preventing an increase in the processing time due to an increase in the size of the matrix.

The size M does not necessarily need to be the size N, but may be set to be larger or smaller than the size N. However, the size M is the length of the hash-calculated bit string, and thus needs to be larger than the length K to obtain a final encryption key having the length K.

The predetermined size N is the length of the corrected bit string as illustrated in FIG. 7, but is not limited thereto. For example, in addition to the case in which the hash calculation is performed on one corrected bit string generated by the error correction processor 203 as illustrated in FIG. 7, the hash calculation using one hash matrix is performed collectively on a plurality of corrected bit strings in some cases. In such a case, the hash matrix needs to have the predetermined size N equal to the sum of the lengths of the corrected bit strings.

The hash calculator 212 transmits the generated hash-calculated bit string to the key extractor 213. Then, the process proceeds to step S15.

Step S14

The key length calculator 211 performs the key length calculation in which the length (the length K of an encryption key illustrated in FIG. 7) of an encryption key finally obtained through the privacy amplification processing is calculated to be a length removing the amount of information probably eavesdropped by an eavesdropper in communication between the transmitter 1 and the receiver 2 based on the pulse statistics information (including the number of counts and the number of errors for each type of pulse) received by the sifting processor 202 and the error rate and the number of leaked bits calculated by the error correction processor 203. Then, the process proceeds to step S15.

Step S15

The key extractor 213 extracts, from the hash-calculated bit string generated by the hash calculator 212, a bit string having the length K of an encryption key calculated by the key length calculator 211, and sets the bit string as a final encryption key.

A random number included in a hash matrix is the same between the hash matrix illustrated in FIG. 5 and the hash matrix illustrated in FIG. 7, and thus the hash matrix illustrated in FIG. 5 is contained as a sub matrix of the hash matrix illustrated in FIG. 7 according to the present embodiment. Thus, when it is assumed that the key extractor 213 extracts the first K bits of the hash-calculated bit string having a length equal to the size M, the finally obtained encryption key is identical to an encryption key obtained through the conventional key distillation processing. However, the present embodiment is not limited to the extraction of the first K bits of the hash-calculated bit string by the key extractor 213, but the last K bits of the hash-calculated bit string having a length equal to the size M may be extracted, or K bits of the hash-calculated bit string may be extracted randomly. Selection of any of these extraction methods does not affect the security of the finally obtained encryption key having the length K. Then, the process proceeds to step S16.

Step S16

The key extractor 213 stores (accumulates) the final encryption key as the extracted bit string in the storage 205.

The key distillation processing according to the present embodiment is performed through the above-described process at steps S11 to S16. The key distillation processing according to the present embodiment, in parallel, executes the key length calculation of calculating the length of a final encryption key using the error rate and the number of leaked bits calculated through the error correction processing by the error correction processor 203, and the pulse statistics information, and executes the hash calculation between a prepared hash matrix having a predetermined size and the corrected bit string. Thereafter, the key extractor 213 uses the length of an encryption key calculated through the key length calculation and the hash-calculated bit string generated through the hash calculation, to extract bits corresponding to a size necessary for generating an encryption key from the hash-calculated bit string, thereby obtaining a final encryption key. In this manner, the key length calculation, which is heavily loaded processing and difficult to process in parallel, and the hash calculation, which is heavily loaded processing, are executed in parallel with each other to improve the processing speed of the privacy amplification processing as a bottleneck of the quantum key distribution in the quantum key distribution system 100, thereby improving the secure key rate.

The extraction processing by the key extractor 213 takes a shorter time than the processing times of the key length calculation and the hash calculation, which are heavily loaded processing as described above. Thus, the effect of reduction in the processing time of the privacy amplification processing as a whole is larger when the key length calculation and the hash calculation are processed in parallel with each other, involving the extraction processing by the key extractor 213 as in the present embodiment than the conventional key distillation processing. In the conventional key distillation processing, the key length calculation and then the hash calculation are performed in series, omitting the extraction processing by the key extractor 213.

Figure 8:
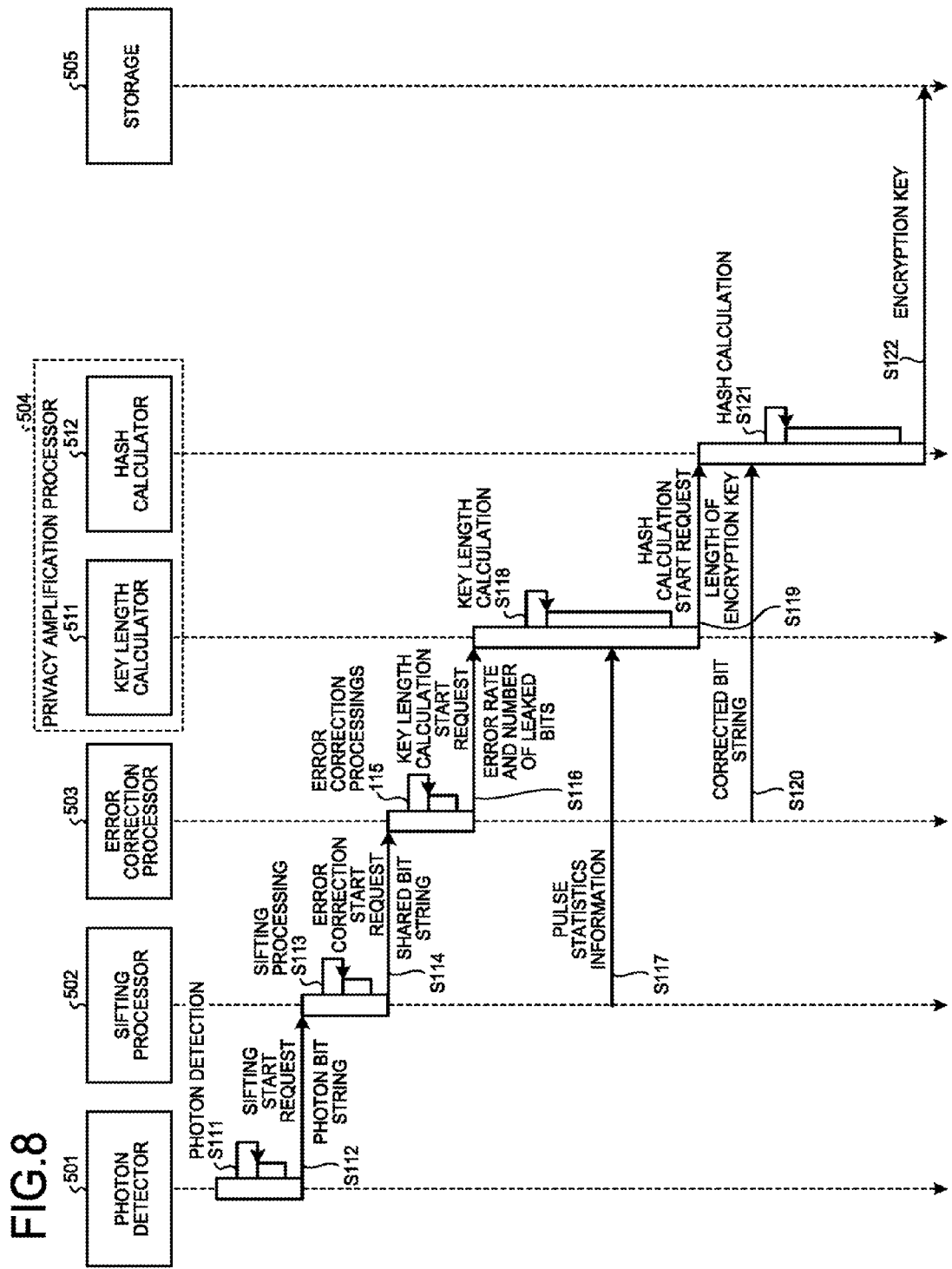
FIG. 8 is a sequence diagram illustrating an exemplary operation of conventional quantum key distribution.

FIG. 8 is a sequence diagram illustrating an exemplary operation of the conventional quantum key distribution. The following describes the operation of the conventional quantum key distribution in detail with reference to FIG. 8.

As illustrated in FIG. 8, the receiver of the conventional quantum key distribution system includes a photon detector 501, a sifting processor 502, an error correction processor 503, a privacy amplification processor 504, and a storage 505. The privacy amplification processor 504 includes a key length calculator 511 and a hash calculator 512.

Step S111

The photon detector 501 performs the photon detection processing of detecting a sequence of photons from a photon transmitter of the transmitter through the quantum communication channel to obtain a photon bit string that is bit information by reading the series of detected photons based on basis information (reception basis) generated by using a basis selected according to a predetermined reference. The photon detector 501 stores the generated photon bit string and reception basis in the storage 505.

Step S112

Having ended the photon detection processing, the photon detector 501 transmits a sifting start request to start the sifting processing and the generated photon bit string to the sifting processor 502.

Step S113

Having received the sifting start request, the sifting processor 502 executes the sifting processing in which basis information (transmission basis) received from the sifting processor of the transmitter through the classical communication channel and basis information (reception basis) generated by the photon detector 501 are compared to extract a bit corresponding to a matching part from the photon bit string and generate a shared bit string. The sifting processor 502 stores the generated shared bit string in the storage 505.

The sifting processor 502 transmits the basis information (transmission basis) to the sifting processor of the transmitter through the classical communication channel. The sifting processor 502 receives the pulse statistics information from the sifting processor of the transmitter through the classical communication channel, and stores the pulse statistics information in the storage 505.

Step S114

Having ended the sifting processing, the sifting processor 502 transmits an error correction start request to start the error correction processing and the generated shared bit string to the error correction processor 503.

Step S115

Having received the error correction start request, the error correction processor 503 executes the error correction processing of exchanging the control data (the EC information) with the error correction processor of the transmitter through the classical communication channel, and correcting a bit error in the shared bit string to generate a corrected bit string. The error correction processor 503 stores the generated corrected bit string in the storage 505.

The error correction processor 503 calculates the error rate of the quantum communication channel from the number of error bits in the shared bit string in the error correction processing, and stores the error rate in the storage 505. The error correction processor 503 also calculates the number of leaked bits based on the amount of the EC information exchanged with the error correction processor of the transmitter to correct a bit error in the shared bit string to generate a corrected bit string, and stores the number of leaked bits in the storage 505.

Step S116

Having ended the error correction processing, the error correction processor 503 transmits a key length calculation start request to start the key length calculation and the calculated error rate and number of leaked bits to the key length calculator 511 of the privacy amplification processor 504.

Step S117

The sifting processor 502 transmits the pulse statistics information to the key length calculator 511.

Step S118

Having received the key length calculation start request, the key length calculator 511 performs the key length calculation in which the length (the length K of an encryption key illustrated in FIG. 5) of an encryption key finally obtained through the privacy amplification processing is calculated to be a length removing the amount of information probably eavesdropped by an eavesdropper in communication between the transmitter and the receiver based on the pulse statistics information (including the number of counts and the number of errors for each type of pulse) received from the sifting processor 502, and the error rate and the number of leaked bits received from the error correction processor 503.

Step S119

Having ended the key length calculation, the key length calculator 511 transmits a hash calculation start request to start the hash calculation and the calculated length of an encryption key to the hash calculator 512 of the privacy amplification processor 504.

Step S120

The error correction processor 503 transmits the generated corrected bit string to the hash calculator 512.

Step S121

Having received the hash calculation start request, the hash calculator 512 generates a hash matrix common to the transmitter and the receiver and having a size corresponding to the length K of an encryption key calculated by the key length calculator 511 and the predetermined size N as illustrated in FIG. 5 described above, and performs the hash calculation using the generated hash matrix on the corrected bit string received from the error correction processor 503 to generate an encryption key having the length K.

Step S122

The hash calculator 512 stores (accumulates) the generated encryption key in the storage 505.

The operation of the conventional quantum key distribution is performed through the above-described process at steps S111 to S122. As described above, the key length calculation and the hash calculation are heavily loaded processing, and the hash calculation determines the size of the hash matrix by using the length of an encryption key calculated by the key length calculation, and thus cannot be executed before the key length calculation. Thus, the conventional key distillation processing executes, in series, the key length calculation and the hash calculation, which are heavily loaded processing, resulting in a longer processing time and further decrease in the secure key rate.

Figure 9:
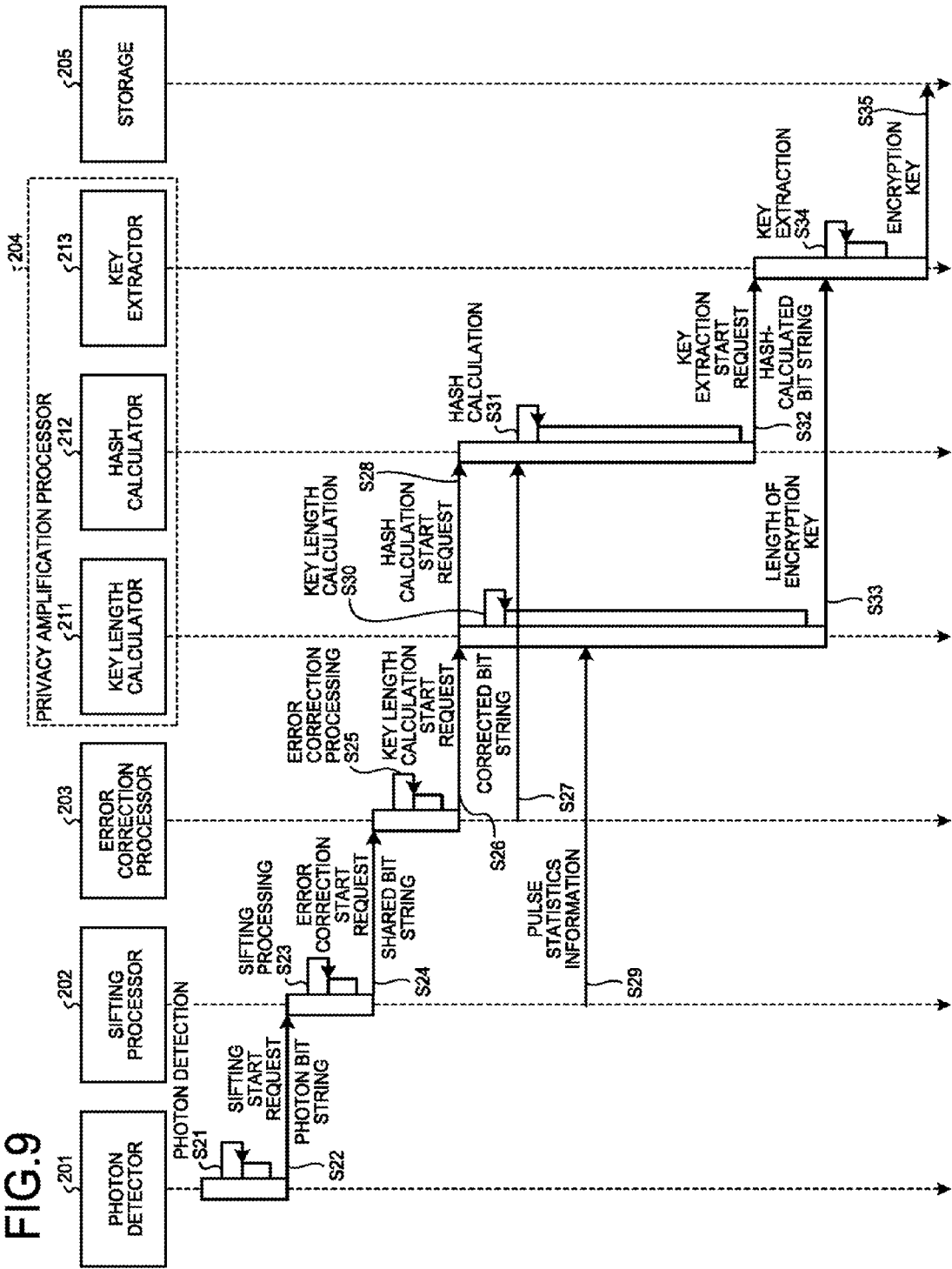
FIG. 9 is a sequence diagram illustrating an operation of quantum key distribution by the receiver according to the first embodiment.

FIG. 9 is a sequence diagram illustrating an exemplary operation of quantum key distribution by the receiver according to the first embodiment. The following describes the operation of the quantum key distribution according to the present embodiment in detail with reference to FIG. 9.

Step S21

The photon detector 201 performs the photon detection processing of detecting a sequence of photons from the photon transmitter 101 of the transmitter 1 through the quantum communication channel, and obtaining a photon bit string that is bit information by reading the series of detected photons based on basis information (reception basis) generated by using a basis selected according to a predetermined reference. The photon detector 201 stores the generated photon bit string and reception basis in the storage 205.

Step S22

Having ended the photon detection processing, the photon detector 201 transmits a sifting start request to start the sifting processing and the generated photon bit string to the sifting processor 202.

Step S23

Having received the sifting start request, the sifting processor 202 executes the sifting processing in which basis information (transmission basis) received from the sifting processor 102 of the transmitter 1 through the classical communication channel and basis information (reception basis) generated by the photon detector 201 are compared with each other to extract a bit corresponding to a matching part from a photon bit string and generate a shared bit string. The sifting processor 202 stores the generated shared bit string in the storage 205.

The sifting processor 202 transmits the basis information (transmission basis) to the sifting processor 102 of the transmitter 1 through the classical communication channel. The sifting processor 202 receives the pulse statistics information from the sifting processor 102 of the transmitter 1 through the classical communication channel, and stores the pulse statistics information in the storage 205.

Step S24

Having ended the sifting processing, the sifting processor 202 transmits an error correction start request to start the error correction processing and the generated shared bit string to the error correction processor 203.

Step S25

Having received the error correction start request, the error correction processor 203 executes the error correction processing of exchanging the control data (the EC information) with the error correction processor 103 of the transmitter 1 through the classical communication channel, and correcting a bit error in the shared bit string to generate a corrected bit string. The error correction processor 203 stores the generated corrected bit string in the storage 205.

The error correction processor 203 also calculates the error rate of the quantum communication channel from the number of error bits in the shared bit string in the error correction processing, and stores the error rate in the storage 205. In addition, the error correction processor 203 calculates the number of leaked bits based on the amount of the EC information exchanged with the error correction processor 103 to correct a bit error in the shared bit string to generate a corrected bit string, and stores the number of leaked bits in the storage 205.

Step S26

Having ended the error correction processing, the error correction processor 203 transmits a key length calculation start request to start the key length calculation and the calculated error rate and number of leaked bits to the key length calculator 211 of the privacy amplification processor 204.

Step S27

The error correction processor 203 transmits the generated corrected bit string to the hash calculator 212 of the privacy amplification processor 204.

Step S28

Having received the key length calculation start request, the key length calculator 211 transmits a hash calculation start request to start the hash calculation to the hash calculator 212. Accordingly, the key length calculation by the key length calculator 211 and the hash calculation by the hash calculator 212 are executed in parallel with each other.

Step S29

The sifting processor 202 transmits the pulse statistics information to the key length calculator 211.

Step S30

Having received the key length calculation start request, the key length calculator 211 performs the key length calculation in which the length (the length K of an encryption key illustrated in FIG. 7) of an encryption key finally obtained through the privacy amplification processing is calculated to be a length removing the amount of information probably eavesdropped by an eavesdropper in communication between the transmitter 1 and the receiver 2 based on the pulse statistics information (including the number of counts and the number of errors for each type of pulse) received from the sifting processor 202, and the error rate and the number of leaked bits received from the error correction processor 203.

Step S31

Having received the hash calculation start request, the hash calculator 212 generates a hash matrix having a size defined by the size M and the predetermined size N and common to the transmitter 1 and the receiver 2 as illustrated in FIG. 7 described above, and performs the hash calculation using the generated hash matrix on the corrected bit string received from the error correction processor 203 to generate a hash-calculated bit string.

Step S32

Having ended the hash calculation, the hash calculator 212 transmits a key extraction start request to start the key extraction and the generated hash-calculated bit string to the key extractor 213 of the privacy amplification processor 204.

Step S33

Having ended the key length calculation, the key length calculator 211 transmits the calculated length K of an encryption key to the key extractor 213.

Step S34

The key extractor 213 extracts, from the hash-calculated bit string received from the hash calculator 212, a bit string having the length K of an encryption key received from the key length calculator 211, and sets the bit string to be a final encryption key.

Step S35

The key extractor 213 stores (accumulates) the encryption key as the extracted bit string in the storage 205.

The operation of the quantum key distribution according to the present embodiment is performed through the above-described process at steps S21 to S35. The quantum key distribution according to the present embodiment, in parallel, executes the key length calculation of calculating the length of a final encryption key by using the error rate and number of leaked bits calculated through the error correction processing by the error correction processor 203, and the pulse statistics information, and executes the hash calculation between a prepared hash matrix having a predetermined size and the corrected bit string. In other words, the hash calculator 212 can execute the hash calculation by using the hash matrix having a predetermined size, before the key length calculation by the key length calculator 211 ends. Thereafter, the key extractor 213 uses the length of an encryption key calculated through the key length calculation and the hash-calculated bit string generated through the hash calculation, to extract, from the hash-calculated bit string, a bit having a size necessary for generating an encryption key. And the key extractor 213 obtains a final encryption key. In this manner, the key length calculation, which is heavily loaded processing and difficult to process in parallel, and the hash calculation, which is heavily loaded processing are executed in parallel to improve the processing speed of the privacy amplification processing as a bottleneck of the quantum key distribution in the quantum key distribution system 100. Accordingly, the processing speed of the quantum key distribution as a whole can be improved to achieve an improved secure key rate.

As illustrated in FIG. 9, the request to start each operation is explicitly described as a trigger for starting processing, but a timing to actually start the processing is not limited thereto.

Second Embodiment

A quantum key distribution system according to a second embodiment will be described with a focus on differences from the quantum key distribution system 100 according to the first embodiment. The configuration of the quantum key distribution system, the hardware configurations of the transmitter and the receiver, and the configuration of the functional block of the transmitter according to the present embodiment are the same as those of the first embodiment.

Figure 10:
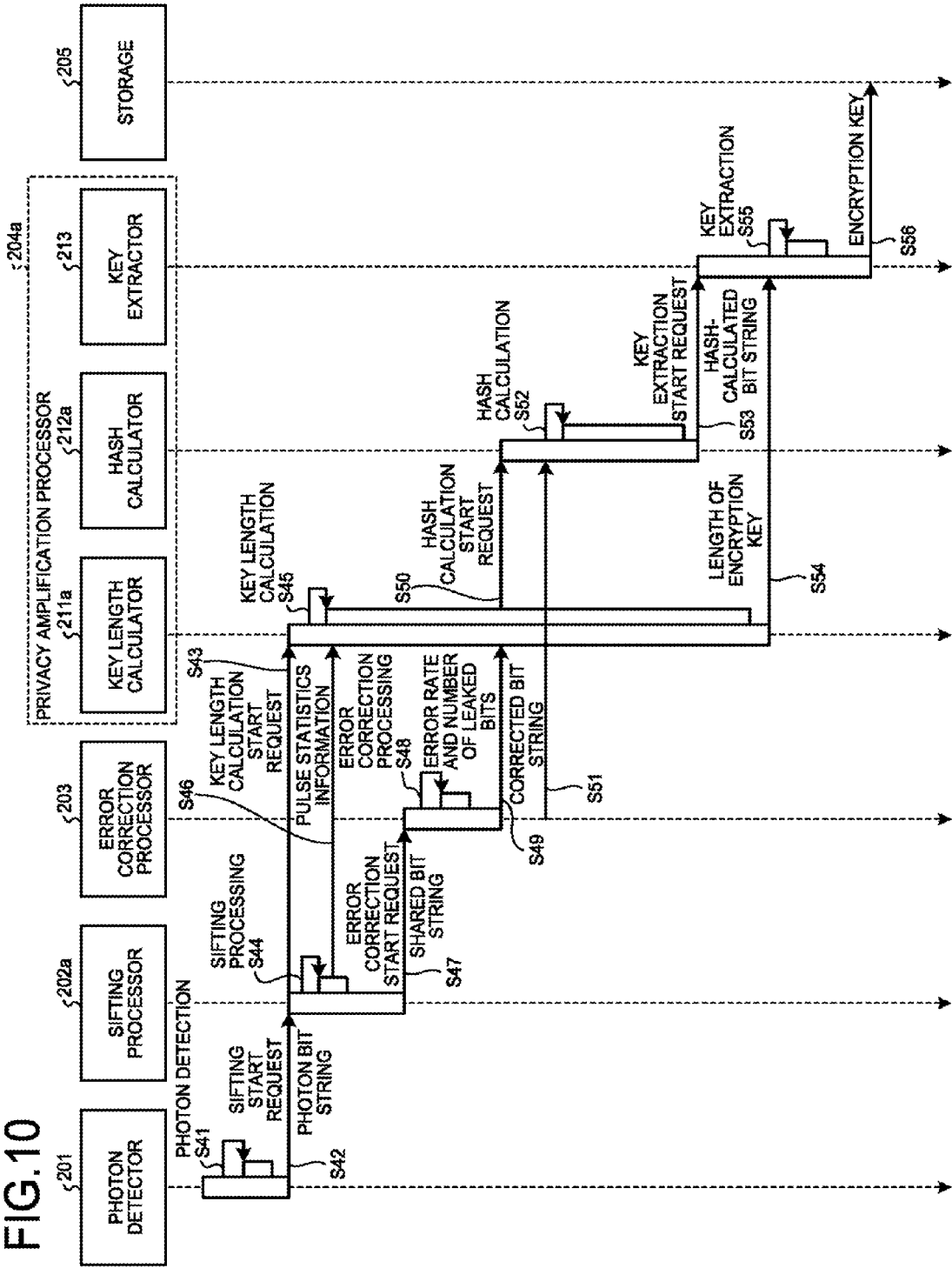
FIG. 10 is a sequence diagram illustrating an operation of quantum key distribution by the receiver according to a second embodiment.

FIG. 10 is a sequence diagram illustrating an exemplary operation of quantum key distribution by the receiver according to the second embodiment. The following describes the operation of the quantum key distribution according to the present embodiment in detail with reference to FIG. 10.

As illustrated in FIG. 10, the receiver of the quantum key distribution system according to the present embodiment includes the photon detector 201, a sifting processor 202a, the error correction processor 203, a privacy amplification processor 204a, and the storage 205. The privacy amplification processor 204a includes a key length calculator 211a, a hash calculator 212a, and the key extractor 213.

Step S41 the photon detector 201 performs the photon detection processing of detecting a sequence of photons from the photon transmitter 101 of the transmitter 1 through the quantum communication channel, and obtaining a photon bit string that is bit information by reading the series of detected photons based on basis information (reception basis) generated by using a basis selected according to a predetermined reference. The photon detector 201 stores the generated photon bit string and reception basis in the storage 205.

Step S42

Having ended the photon detection processing, the photon detector 201 transmits a sifting start request to start the sifting processing and the generated photon bit string to the sifting processor 202a.

Step S43

Having received the sifting start request, the sifting processor 202a transmits a key length calculation start request to start the key length calculation to the key length calculator 211a of the privacy amplification processor 204a.

Step S44

Having received the sifting start request, the sifting processor 202a executes the sifting processing in which basis information (transmission basis) received from the sifting processor 102 of the transmitter 1 through the classical communication channel and basis information (reception basis) generated by the photon detector 201 are compared with each other to extract a bit corresponding to a matching part from a photon bit string and generate a shared bit string. The sifting processor 202a stores the generated shared bit string in the storage 205.

The sifting processor 202a transmits the basis information (transmission basis) to the sifting processor 102 of the transmitter 1 through the classical communication channel. The sifting processor 202a receives the pulse statistics information from the sifting processor 102 of the transmitter 1 through the classical communication channel, and stores the pulse statistics information in the storage 205.

Step S45

Having received the key length calculation start request, the key length calculator 211a starts the key length calculation in which the length (the length K of an encryption key illustrated in FIG. 7) of an encryption key finally obtained through the privacy amplification processing is calculated to be a length removing the amount of information probably eavesdropped by an eavesdropper in communication between the transmitter 1 and the receiver 2. In other words, in the present embodiment, unlike the first embodiment, the process of the key length calculation by the key length calculator 211a is started before the error correction processing by the error correction processor 203 ends. The key length calculator 211a receives the pulse statistics information at step S46 to be described later, and then at step S49, sequentially executes the process of the key length calculation while receiving the error rate and the number of leaked bits.

Step S46

Having received the pulse statistics information from the sifting processor 102 of the transmitter 1 through the classical communication channel in the sifting processing, the sifting processor 202a transmits the pulse statistics information to the key length calculator 211a.

Step S47

Having ended the sifting processing, the sifting processor 202a transmits an error correction start request to start the error correction processing and the generated shared bit string to the error correction processor 203.

Step S48

Having received the error correction start request, the error correction processor 203 executes the error correction processing of exchanging the control data (the EC information) with the error correction processor 103 of the transmitter 1 through the classical communication channel, and correcting a bit error in the shared bit string to generate a corrected bit string. The error correction processor 203 stores the generated corrected bit string in the storage 205.

The error correction processor 203 also calculates the error rate of the quantum communication channel from the number of error bits in the shared bit string in the error correction processing, and stores the error rate in the storage 205. In addition, the error correction processor 203 calculates the number of leaked bits based on the amount of the EC information exchanged with the error correction processor 103 to correct a bit error in the shared bit string to generate a corrected bit string, and stores the number of leaked bits in the storage 205.

Step S49

Having ended the error correction processing, the error correction processor 203 transmits the calculated error rate and number of leaked bits to the key length calculator 211a. Having received all of the pulse statistics information (including the number of counts and the number of errors for each type of pulse) from the sifting processor 202a, and the error rate and the number of leaked bits from the error correction processor 203, the key length calculator 211a can complete the key length calculation of calculating the length of an encryption key.

Step S50

Having received the error rate and the number of leaked bits from the error correction processor 203, the key length calculator 211a transmits a hash calculation start request to start the hash calculation to the hash calculator 212a of the privacy amplification processor 204a.

Step S51

Having ended the error correction processing, the error correction processor 203 transmits the generated corrected bit string to the hash calculator 212a.

Step S52

Having received the hash calculation start request, the hash calculator 212a generates a hash matrix having a size defined by the size M and the predetermined size N and common to the transmitter and the receiver as illustrated in FIG. 7 described above, and performs the hash calculation using the generated hash matrix on the corrected bit string received from the error correction processor 203 to generate a hash-calculated bit string.

Step S53

Having ended the hash calculation, the hash calculator 212a transmits a key extraction start request to start the key extraction and the generated hash-calculated bit string to the key extractor 213 of the privacy amplification processor 204a.

Step S54

Having ended the key length calculation, the key length calculator 211a transmits the calculated length K of an encryption key to the key extractor 213.

Step S55

The key extractor 213 extracts, from the hash-calculated bit string received from the hash calculator 212a, a bit string having the length K of an encryption key received from the key length calculator 211a, and sets the bit string to be a final encryption key.

Step S56

The key extractor 213 stores (accumulates) the encryption key as the extracted bit string in the storage 205.

The operation of the quantum key distribution according to the present embodiment is performed through the above-described process at steps S41 to S56. In the present embodiment, the key length calculation and the hash calculation are executed in parallel similarly to the first embodiment, and moreover, the process of the key length calculation is started before the error correction processing by the error correction processor 203 ends (specifically, at a timing when the sifting processing by the sifting processor 202a is started). The key length calculator 211a receives the pulse statistics information from the sifting processor 202a, and then sequentially executes the process of the key length calculation while receiving the error rate and the number of leaked bits from the error correction processor 203. Thus, the timing of starting the key length calculation by the key length calculator 211a is earlier than that in the first embodiment, and accordingly, the processing speed of the privacy amplification processing in the quantum key distribution can be further improved. Consequently, the processing speed of the quantum key distribution as a whole can be improved to achieve an improved secure key rate.

As illustrated in FIG. 10, the request to start each operation is explicitly described as a trigger for starting processing, but a timing to actually start the processing is not limited thereto.

Third Embodiment

The following describes a quantum key distribution system according to a third embodiment, mainly any difference from the quantum key distribution system 100 according to the first embodiment. The configuration of the quantum key distribution system and the hardware configurations of the transmitter and the receiver according to the present embodiment are the same as those in the first embodiment.

Figure 11:
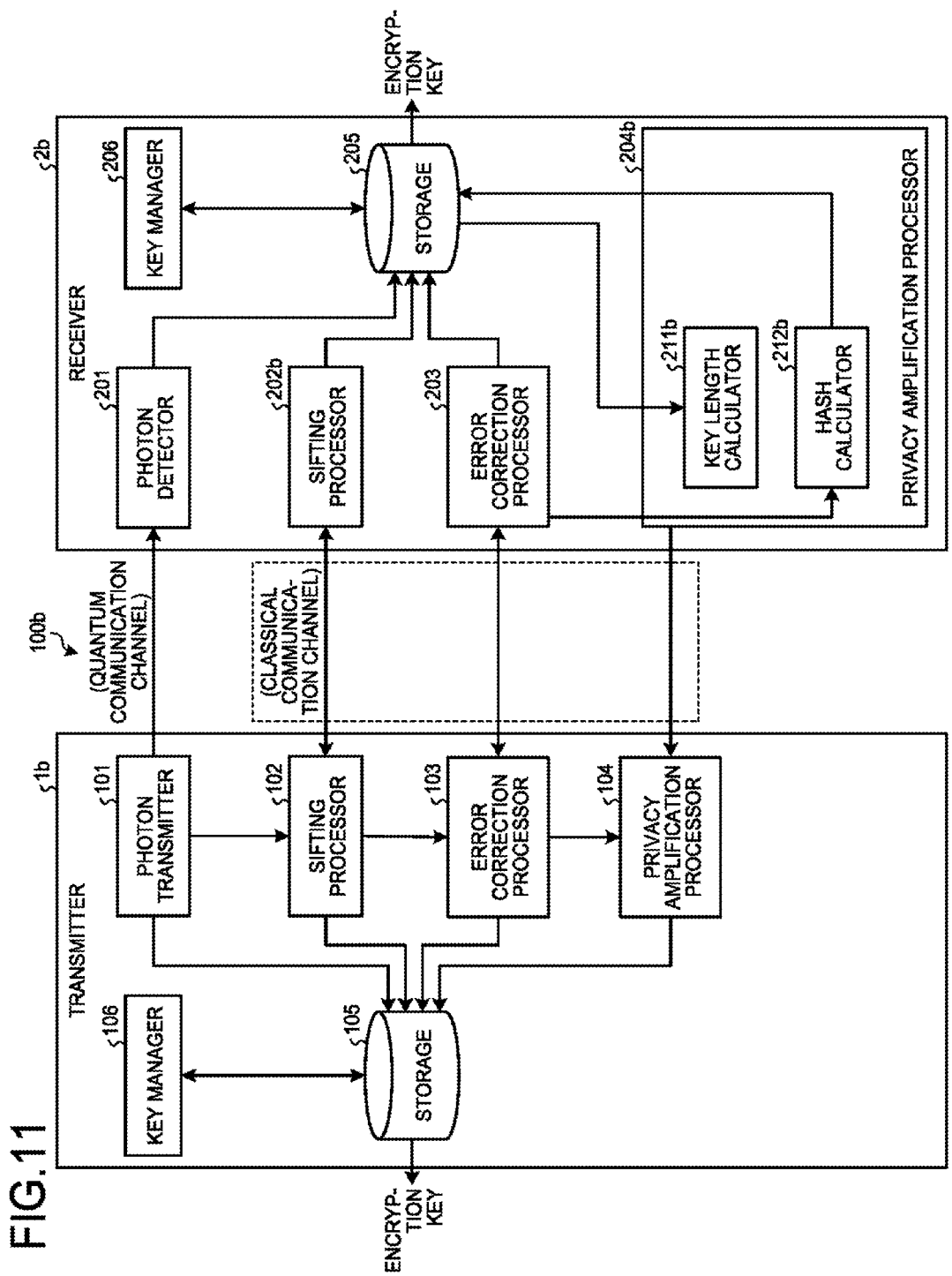
FIG. 11 is a diagram illustrating a functional block configuration of the quantum key distribution system according to a third embodiment.

FIG. 11 is a diagram illustrating an example of a configuration of functional blocks in the quantum key distribution system according to the third embodiment. The following describes the configuration and operations of the functional blocks in a transmitter 1b and a receiver 2b of this quantum key distribution system 100b with reference to FIG. 11.

As illustrated in FIG. 11, the transmitter 1b includes the photon transmitter 101, the sifting processor 102, the error correction processor 103, the privacy amplification processor 104, the storage 105, and the key manager 106. The operations of these functional units are the same as the operations of the functional units of the transmitter 1 according to the first embodiment.

As illustrated in FIG. 11, the receiver 2b includes the photon detector 201, a sifting processor 202b, the error correction processor 203, a privacy amplification processor 204b, the storage 205, and the key manager 206. Among these, the operations of the photon detector 201, the error correction processor 203, the storage 205, and the key manager 206 are the same as the operations of the photon detector 201, the error correction processor 203, the storage 205, and the key manager 206 of the transmitter 1 according to the first embodiment.

The sifting processor 202b is a functional unit configured to execute the sifting processing in which basis information (transmission basis) received from the sifting processor 102 of the transmitter 1b through the classical communication channel, and basis information (reception basis) generated by the photon detector 201 are compared to extract a bit corresponding to a matching part from a photon bit string and generate a shared bit string. Similarly to the sifting processor 202a according to the second embodiment, having received the sifting start request, the sifting processor 202b transmits a key length calculation start request to start the key length calculation to a key length calculator 211b of the privacy amplification processor 204b to be described later. The photon bit string used by the sifting processor 202b may be obtained by reading the photon bit string stored in the storage 205 by the photon detector 201, or may be a photon bit string directly received from the photon detector 201.

The sifting processor 202b stores the generated shared bit string in the storage 205, and transmits the generated shared bit string to the error correction processor 203. The sifting processor 202b transmits the basis information (transmission basis) to the sifting processor 102 of the transmitter 1b through the classical communication channel. The sifting processor 202b receives the pulse statistics information from the sifting processor 102 of the transmitter 1b through the classical communication channel, and stores the pulse statistics information in the storage 205. The sifting processing described above is exemplary, and any other method is applicable.

The privacy amplification processor 204b is a functional unit configured to generate the control information (PA information), transmit the PA information to the privacy amplification processor 104 of the transmitter 1b through the classical communication channel, and generate an encryption key by performing, on the corrected bit string based on this PA information, the privacy amplification processing of discarding a bit probably leaked and eavesdropped by an eavesdropper in the photon transmission processing, the sifting processing, and the error correction processing in theory. The corrected bit string used by the privacy amplification processor 204b may be obtained by reading the corrected bit string stored in the storage 205 by the error correction processor 203, or may be a corrected bit string directly received from the error correction processor 203. The privacy amplification processor 204b includes the key length calculator 211b and a hash calculator 212b. In other words, unlike the privacy amplification processor 204 according to the first embodiment, the privacy amplification processor 204b does not include a functional unit corresponding to the key extractor 213.

The key length calculator 211b is a functional unit configured to perform the key length calculation in which the length of an encryption key finally obtained through the privacy amplification processing is calculated to be a length removing the amount of information probably eavesdropped by an eavesdropper in communication between the transmitter 1b and the receiver 2b based on the pulse statistics information (including the number of counts and the number of errors for each type of pulse) received by the sifting processor 202 and the error rate and the number of leaked bits calculated by the error correction processor 203. Similarly to the second embodiment, the process of the key length calculation by the key length calculator 211b is started at a timing when the key length calculation start request is received from the sifting processor 202, in other words, at a timing when the sifting processing by the sifting processor 202 is started. The key length calculator 211b transmits the calculated length of an encryption key to the hash calculator 212b.

The pulse statistics information, the error rate, and the number of leaked bits used by the key length calculator 211b may be obtained by reading the pulse statistics information, the error rate, and the number of leaked bits stored in the storage 205, or may be information directly received from the sifting processor 202 and the error correction processor 203.

The hash calculator 212b is a functional unit configured to generate a hash matrix common to the transmitter 1b and the receiver 2b and having a size corresponding to the length K of an encryption key calculated by the key length calculator 211b and the predetermined size N, and generate an encryption key having the length K by performing the hash calculation using the generated hash matrix on the corrected bit string generated by the error correction processor 203 of the receiver 2b. The hash calculator 212b stores (accumulates) the generated encryption key in the storage 205.

The photon detector 201, the sifting processor 202, the error correction processor 203, the key length calculator 211b and the hash calculator 212b of the privacy amplification processor 204b, and the key manager 206 described above are each achieved by the CPU 51 illustrated in FIG. 2 loading a computer program stored in, for example, the auxiliary storage device 55 onto the RAM 53, and executing the computer program. Not all of the photon detector 201, the sifting processor 202, the error correction processor 203, the key length calculator 211b and the hash calculator 212b of the privacy amplification processor 204b, and the key manager 206 need to be achieved through execution of a computer program. At least one of them may be achieved by, for example, a hardware circuit such as an ASIC, an FPGA, or any other integrated circuit.

FIG. 11 conceptually illustrates functions of the photon detector 201, the sifting processor 202, the error correction processor 203, the key length calculator 211b and the hash calculator 212b of the privacy amplification processor 204b, the storage 205, and the key manager 206, and the present embodiment is not limited to such a configuration. For example, in the receiver 2b illustrated in FIG. 11, a plurality of functional units illustrated as independent functional units may be configured as one functional unit. Alternatively, in the receiver 2b illustrated in FIG. 11, a function of one functional unit may be divided into a plurality of functions, and the one functional unit may be configured as a plurality of functional units.

Figure 12:
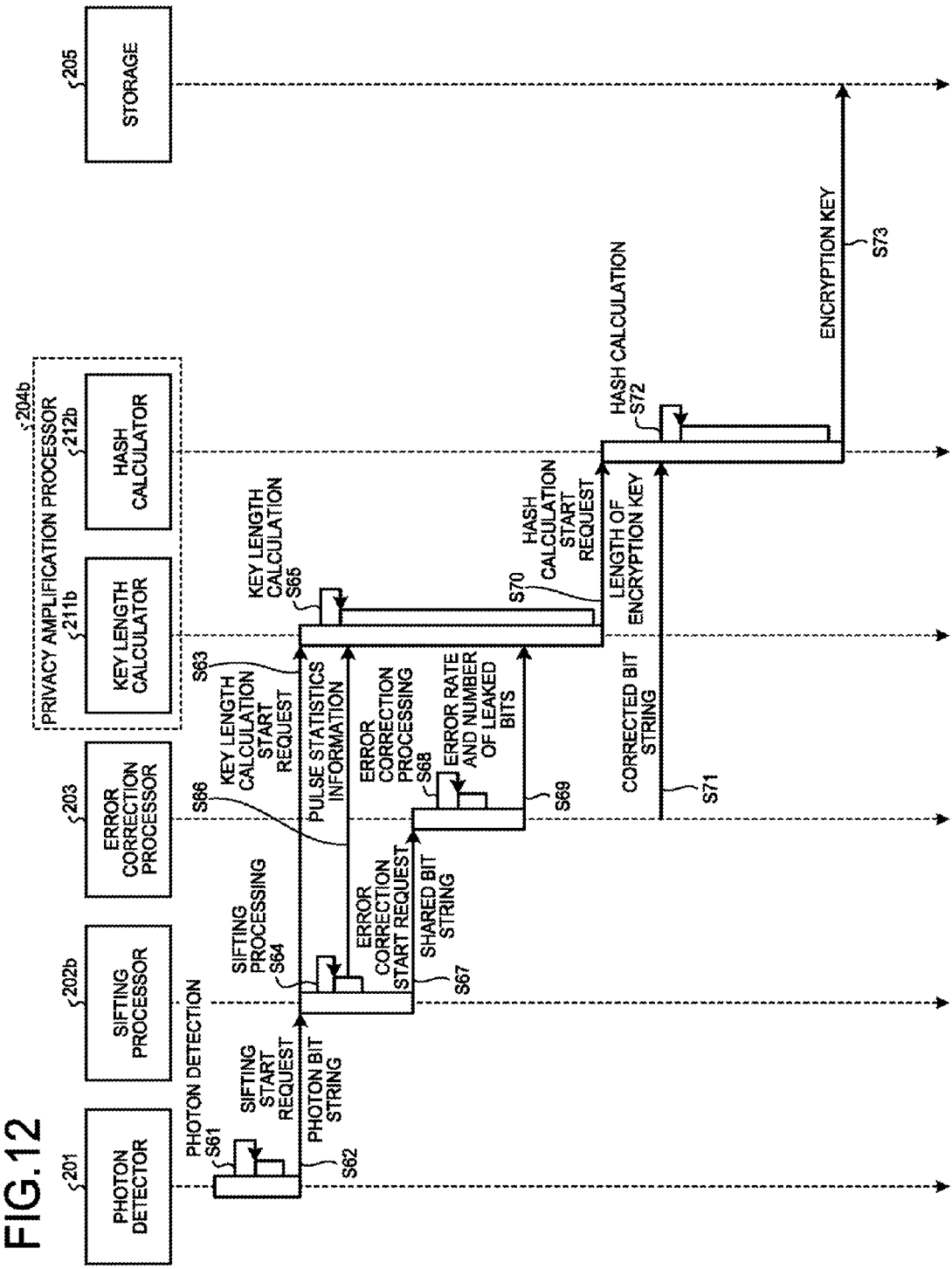
FIG. 12 is a sequence diagram illustrating an operation of quantum key distribution by the receiver according to the third embodiment.

FIG. 12 is a sequence diagram illustrating an exemplary operation of quantum key distribution by the receiver according to the third embodiment. The following describes the operation of the quantum key distribution according to the present embodiment in detail with reference to FIG. 12.

Step S61

The photon detector 201 performs the photon detection processing of detecting a sequence of photons from the photon transmitter 101 of the transmitter 1b through the quantum communication channel, and obtaining a photon bit string that is bit information by reading the series of detected photons based on basis information (reception basis) generated by using a basis selected according to a predetermined reference. The photon detector 201 stores the generated photon bit string and reception basis in the storage 205.

Step S62

Having ended the photon detection processing, the photon detector 201 transmits a sifting start request to start the sifting processing and the generated photon bit string to the sifting processor 202b.

Step S63

Having received the sifting start request, the sifting processor 202b transmits a key length calculation start request to start the key length calculation to the key length calculator 211b of the privacy amplification processor 204b.

Step S64

Having received the sifting start request, the sifting processor 202b executes the sifting processing in which basis information (transmission basis) received from the sifting processor 102 of the transmitter 1b through the classical communication channel and basis information (reception basis) generated by the photon detector 201 are compared to extract a bit corresponding to a matching part from the photon bit string and generate a shared bit string. The sifting processor 202b stores the generated shared bit string in the storage 205.

The sifting processor 202b transmits the basis information (transmission basis) to the sifting processor 102 of the transmitter 1b through the classical communication channel. The sifting processor 202b receives the pulse statistics information from the sifting processor 102 of the transmitter 1b through the classical communication channel, and stores the pulse statistics information in the storage 205.

Step S65

Having received the key length calculation start request, the key length calculator 211b starts the key length calculation in which the length (the length K of an encryption key illustrated in FIG. 7) of an encryption key finally obtained through the privacy amplification processing is calculated to be a length removing the amount of information probably eavesdropped by an eavesdropper in communication between the transmitter 1b and the receiver 2b. In other words, in the present embodiment, similarly to the second embodiment, the process of the key length calculation by the key length calculator 211b is started before the error correction processing by the error correction processor 203 ends. The key length calculator 211b receives the pulse statistics information at step S66 to be described later, and then sequentially executes the process of the key length calculation while receiving the error rate and the number of leaked bits at step S69.

Step S66

Having received the pulse statistics information from the sifting processor 102 of the transmitter 1b through the classical communication channel in the sifting processing, the sifting processor 202b transmits the pulse statistics information to the key length calculator 211b.

Step S67

Having ended the sifting processing, the sifting processor 202b transmits an error correction start request to start the error correction processing and the generated shared bit string to the error correction processor 203.

Step S68

Having received the error correction start request, the error correction processor 203 executes the error correction processing of exchanging the control data (the EC information) with the error correction processor 103 of the transmitter 1b through the classical communication channel, and correcting a bit error in the shared bit string to generate a corrected bit string. The error correction processor 203 stores the generated corrected bit string in the storage 205.

The error correction processor 203 also calculates the error rate of the quantum communication channel from the number of error bits in the shared bit string in the error correction processing, and stores the error rate in the storage 205. In addition, the error correction processor 203 calculates the number of leaked bits based on the amount of the EC information exchanged with the error correction processor 103 to correct a bit error in the shared bit string to generate a corrected bit string, and stores the number of leaked bits in the storage 205.

Step S69

Having ended the error correction processing, the error correction processor 203 transmits the calculated error rate and number of leaked bits to the key length calculator 211b. Having received all of the pulse statistics information (including the number of counts and the number of errors for each type of pulse) from the sifting processor 202b, and the error rate and the number of leaked bits from the error correction processor 203, the key length calculator 211b can complete the key length calculation of calculating the length of an encryption key.

Step S70

Having ended the key length calculation, the key length calculator 211b transmits a hash calculation start request to start the hash calculation and the calculated length of an encryption key to the hash calculator 212b of the privacy amplification processor 204b.

Step S71

The error correction processor 203 transmits the generated corrected bit string to the hash calculator 212b.

Step S72

Having received the hash calculation start request, the hash calculator 212b generates a hash matrix common to the transmitter 1b and the receiver 2b and having a size corresponding to the length K of an encryption key calculated by the key length calculator 211b and the predetermined size N, and generates an encryption key having the length K by performing the hash calculation using the generated hash matrix on the corrected bit string received from the error correction processor 203.

Step S73

The hash calculator 212b stores (accumulates) the generated encryption key in the storage 205.

The operation of the quantum key distribution according to the present embodiment is performed through the above-described process at steps S61 to S73. In the present embodiment, similarly to the privacy amplification processing in the conventional quantum key distribution, the size of the hash matrix is determined by using the length of an encryption key calculated by the key length calculation, and the hash calculation is performed in the privacy amplification processing by the privacy amplification processor 204b. In other words, the key length calculation and the hash calculation are executed in series, and the process of the key extraction is omitted. However, in the privacy amplification processing by the privacy amplification processor 204b according to the present embodiment, unlike the conventional quantum key distribution, the process of the key length calculation in the privacy amplification processing is started before the error correction processing by the error correction processor 203 ends (specifically, at a timing when the sifting processing by the sifting processor 202b is started). The key length calculator 211b receives the pulse statistics information from the sifting processor 202b, and then sequentially executes the process of the key length calculation while receiving the error rate and the number of leaked bits from the error correction processor 203. Accordingly, the privacy amplification processing, which is heavily loaded processing, in other words, the key length calculation by the key length calculator 211b can be started at an earlier timing as compared to the conventional quantum key distribution, and thus the processing speed of the quantum key distribution as a whole can be improved to achieve an improved secure key rate.

As illustrated in FIG. 12, the request to start each operation is explicitly described as a trigger for starting processing, but a timing to actually start the processing is not limited thereto.

In the above-described embodiments, the sifting processor 202 (202a, 202b) receives the pulse statistics information generated by the sifting processor 102 of the transmitter, but the embodiments are not limited thereto. In other words, the sifting processor 202 (202a, 202b) may receive information indicating a pulse that each bit of the photon bit string corresponds to from the sifting processor 102 of the transmitter, and generate the pulse statistics information by itself using the information.

In the above-described embodiments, the privacy amplification processor 204 (204a, 204b) is included in the receiver, but the embodiments are not limited thereto, but the privacy amplification processor 204 (204a, 204b) may be included in the transmitter. In this case, for example, the size of an encryption key calculated by the privacy amplification processor of the transmitter needs to be transmitted as the PA information to the receiver. Alternatively, the receiver and the transmitter may each include a configuration equivalent to the privacy amplification processor 204 (204a, 204b).

The computer programs to be executed by each of the transmitter and the receiver according to either of the embodiments described above may be provided, for example, by being incorporated in, for example, the ROM 52 in advance.

The computer programs to be executed by each of the transmitter and the receiver according to either of the embodiments described above may be recorded as files in an installable format or an executable format on a computer-readable recording medium, such as a compact disc read-only memory (CD-ROM), a flexible disk (FD), a compact disc recordable (CD-R), or a digital versatile disc (DVD), and provided as a computer program product.

The computer programs to be executed by each of the transmitter and the receiver according to either of the embodiments described above may be stored on a computer connected to a network, such as the Internet, and provided by being downloaded through the network, or may alternatively be provided or distributed through a network, such as the Internet.

The computer programs to be executed by each of the transmitter and the receiver according to either of the embodiments described above can cause a computer to function as each functional unit of the transmitter and the receiver described above. On this computer, the CPU 51 can read the computer programs from the computer-readable recording medium into a main memory to execute the computer programs.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A communication device connected with another communication device through a quantum communication channel to share an encryption key with the other communication device, the device comprising:
a photon communication unit configured to acquire a sequence of photons by photon transmission and reception processing through the quantum communication channel and acquire a photon bit string that is bit information corresponding to the sequence of photons based on generated basis information; and
a hardware processor configured to function as:
a sifter configured to generate a shared bit string from the photon bit string by sifting processing using the basis information;
an error corrector configured to generate a corrected bit string by correcting an error included in the shared bit string by error correction processing;
a first calculator configured to calculate a length of the encryption key;
a second calculator configured to generate a hash-calculated bit string by performing hash calculation on the corrected bit string using first information having a particular size for the hash calculation; and
an extractor configured to extract, as the encryption key, from the hash-calculated bit string, a bit string having the length of the encryption key calculated by the first calculator, wherein
at least part of the calculating the length of the encryption key by the first calculator and at least part of the generating the hash-calculated bit string by the second calculator are executed in parallel,
the error corrector calculates an error rate of the quantum communication channel from the number of error bits in the shared bit string in the error correction processing, and
the first calculator calculates, after the error correction processing, the length of the encryption key using second information generated by the sifting processing and corresponding to a photon and using the error rate calculated by the error correction processing.

2. The device according to claim 1, wherein the second calculator performs the hash calculation using the first information having a size defined based on a predetermined number of lengths of the corrected bit strings.

3. The device according to claim 1, wherein
the error corrector calculates the number of leaked bits based on control information communicated with the other communication device in the error correction processing, and
the first calculator further calculates the length of the encryption key using the number of leaked bits.

4. A communication device connected with another communication device through a quantum communication channel to share an encryption key with the other communication device, the device comprising:
a photon communication unit configured to acquire a sequence of photons by photon transmission and reception processing through the quantum communication channel and acquire a photon bit string that is bit information corresponding to the sequence of photons based on generated basis information; and a hardware processor configured to function as:
- a sifter configured to generate a shared bit string from the photon bit string by sifting processing using the basis information;
- an error corrector configured to generate a corrected bit string by correcting an error included in the shared bit string by error correction processing;
- a first calculator configured to calculate a length of the encryption key;
- a second calculator configured to generate a hash-calculated bit string by performing hash calculation on the corrected bit string using first information having a particular size for the hash calculation; and
- an extractor configured to extract, as the encryption key, from the hash-calculated bit string, a bit string having the length of the encryption key calculated by the first calculator, wherein at least part of the calculating the length of the encryption key by the first calculator and at least part of the generating the hash-calculated bit string by the second calculator are executed in parallel, the first calculator starts, when receiving second information generated by the sifting processing and corresponding to a photon, calculation of the length of the encryption key using the second information, the error corrector calculates an error rate of the quantum communication channel from the number of error bits in the shared bit string in the error correction processing, and the first calculator calculates the length of the encryption key further using the error rate.

5. The device according to claim 4, wherein
the error corrector calculates the number of leaked bits based on control information communicated with the other communication device in the error correction processing, and
the first calculator calculates the length of the encryption key further using the number of leaked bits.

6. A quantum key distribution system comprising a plurality of communication devices connected with each other through a quantum communication channel to share an encryption key, wherein at least one of the communication devices includes
- a photon communication unit configured to acquire a sequence of photons by photon transmission and reception processing through the quantum communication channel and acquire a photon bit string that is bit information corresponding to the sequence of photons based on generated basis information; and
- a hardware processor configured to function as:
  - a sifter configured to generate a shared bit string from the photon bit string by sifting processing using the basis information;
  - an error corrector configured to generate a corrected bit string by correcting an error included in the shared bit string by error correction processing;
  - a first calculator configured to calculate a length of the encryption key;
  - a second calculator configured to generate a hash-calculated bit string by performing hash calculation on the corrected bit string using first information having a particular size for the hash calculation; and
  - an extractor configured to extract, as the encryption key, from the hash-calculated bit string, a bit string having the length of the encryption key calculated by the first calculator, at least part of the calculating the length of the encryption key by the first calculator and at least part of the generating the hash-calculated bit string by the second calculator are executed in parallel, the error corrector calculates an error rate of the quantum communication channel from the number of error bits in the shared bit string in the error correction processing, and the first calculator calculates, after the error correction processing, the length of the encryption key using second information generated by the sifting processing and corresponding to a photon and using the error rate calculated by the error correction processing.

* * * * *